(12) United States Patent
Steele, Jr. et al.

(10) Patent No.: US 9,244,857 B2
(45) Date of Patent: Jan. 26, 2016

(54) SYSTEMS AND METHODS FOR IMPLEMENTING LOW-LATENCY LOOKUP CIRCUITS USING MULTIPLE HASH FUNCTIONS

(71) Applicant: Oracle International Corporation, Redwood City, CA (US)

(72) Inventors: Guy L. Steele, Jr., Burlington, MA (US); David R. Chase, Belmont, MA (US); Nils Gura, Belmont, CA (US)

(73) Assignee: Oracle International Corporation, Redwood City, CA (US)

( * ) Notice: Subject to any disclaimer, the term of this patent is extended or adjusted under 35 U.S.C. 154(b) by 259 days.

(21) Appl. No.: 14/069,253

(22) Filed: Oct. 31, 2013

(65) Prior Publication Data

US 2015/0121034 A1 Apr. 30, 2015

(51) Int. Cl.
*G06F 12/10* (2006.01)

(52) U.S. Cl.
CPC .................................. *G06F 12/1018* (2013.01)

(58) Field of Classification Search
CPC .......... G06F 14/3033; G06F 17/30097; G06F 12/1018; G06F 9/30036; G06F 12/10; G06F 711/216; G06F 12/30949; H04L 12/5689
USPC ........................................... 711/216; 707/747
See application file for complete search history.

(56) References Cited

U.S. PATENT DOCUMENTS

| 6,700,809 B1 * | 3/2004 | Ng ........................ G11C 15/00 365/236 |
| 7,738,454 B1 * | 6/2010 | Panwar .................. H04L 45/745 365/49.17 |
| 8,661,042 B2 * | 2/2014 | Scholz .............. G06F 17/30699 707/747 |
| 8,706,701 B1 * | 4/2014 | Stefanov ................... G06F 7/00 707/687 |
| 8,775,393 B2 * | 7/2014 | Chao .................. G06F 17/30946 707/698 |
| 8,938,469 B1 * | 1/2015 | Keen ............................. 707/747 |
| 2002/0091715 A1 * | 7/2002 | Coady ............... G06F 17/30684 1/1 |
| 2003/0033276 A1 * | 2/2003 | Cheng ............... G06F 17/30982 1/1 |
| 2004/0019764 A1 * | 1/2004 | Steiss ...................... G06F 9/345 711/216 |
| 2004/0123265 A1 * | 6/2004 | Andreev ................. G03F 1/144 716/53 |
| 2007/0271398 A1 * | 11/2007 | Manchester ............. H04B 3/54 709/249 |

(Continued)

OTHER PUBLICATIONS

Thomas H. Cormen, et al., "Introduction to Algorithms", The MIT Press, 1990, pp. 440-461.

(Continued)

*Primary Examiner* — Aimee Li
*Assistant Examiner* — Alex Olson
(74) *Attorney, Agent, or Firm* — Robert C. Kowert; Meyertons, Hood, Kivlin, Kowert & Goetzel, P.C.

(57) ABSTRACT

A lookup circuit evaluates hash functions that map keys to addresses in lookup tables. The circuit may include multiple hash function sub-circuits, each of which applies a respective hash function to an input key value, producing a hash value. Each hash function sub-circuit (which may include a programmable hash table) may multiply bit vectors representing key values by a bit matrix and add a constant bit vector to the results. Each hash value may be used to access a location in a lookup table in memory to obtain its contents (e.g., a key and associated data). The circuit may include a selection sub-circuit that selects the data of one of the identified locations as an output of the lookup circuit (e.g., one whose key matches the input key). The circuit may modify obtained data prior to its selection and may output a signal indicating the validity of input keys.

20 Claims, 15 Drawing Sheets

(56) References Cited

U.S. PATENT DOCUMENTS

| | | | | |
|---|---|---|---|---|
| 2012/0096009 A1* | 4/2012 | Scholz | ............ | G06F 17/30699 707/748 |
| 2012/0246400 A1* | 9/2012 | Bhadra | ............ | H04L 49/3009 711/104 |
| 2013/0097387 A1* | 4/2013 | Sanchez Martin | .. | G06F 12/0862 711/129 |

OTHER PUBLICATIONS

Prentice-Hall Series in Automatic Computation, "A Discipline of Programming", Edsger W. Dijkstra, 1976, pp. 161-167.

Henry S. Warren, Jr., "Hacker's Delight", 2003, pp. 74-75.

U.S. Appl. No. 14/106,476, filed Dec. 13, 2013, David R. Chase.

F. C. Botelho, D. Menoti, N. Ziviani. A new algorithm for constructing minimal perfect hash functions, Technical Report TR004/04, Department of Computer Science, Federal University of Minas Gerais, pp. 1-13, 2004.

Buhler, Jeremy. Mercury BLAST dictionaries: Analysis and performance measurement. Report 2007-13. Depart of Computer Science and Engineering, Washington University in St. Louis, Mo. Feb., pp. 1-9, 2007.

J.Lawrence Carter, Mark N. Wegman, Universal classes of hash functions. Journal of Computer and System Sciences, vol. 18, Issue 2, Apr. 1979, pp. 143-154. ISSN 0022-0000.

Z.J. Czech, G. Havas, and B.S. Majewski. An optimal algorithm for generating minimal perfect hash functions, Information Processing Letters, 43(5):257-264, 1992.

Rasmus Pagh and Flemming Friche Rodler. 2004. Cuckoo hashing. J. Algorithms 51, 2 (May 2004), 122-144.

Tran Ngoc Thinh, Kittitornkun, S., and Tomiyama, S. Applying Cuckoo Hashing for FPGA-based Pattern Matching in NIDS/NIPS. Proc. International Conference on Field-Programmable Technology (ICFPT), 2007, pp. 121-128, 12-14 Dec. 2007.

Wikipedia article "Disjoint-set data structure" http://en.wikipedia.org/wiki/Disjointset_data_structure; pp. 1-5, accessed Oct. 31, 2013.

Xilinx, Inc. Virtex-5 FPGA User Guide. UG190 (v5.4) Mar. 16, 2012. http://www.xilinx.com/support/documentation/user_guides/ug190.pdf, pp. 173-210, [accessed Oct. 31, 2013].

Havas, George, Majewski, Bohdan S., Wormald, Nicholas C., and Czech, Zbigniew J. Graphs, hypergraphs and hashing. In Graph-Theoretic Concepts in Computer Science (Leeuwen, Jan, ed.). Lecture Notes in Computer Science 790 (Springer, Berlin and Heidelberg, 1994), pp. 153-165.

CMPH, C Minimal Perfect Hashing Library, Jun. 9, 2012, pp. 1-5.

Tarjan, Robert Endre. 1975. Efficiency of a Good but not Linear Set Union Algorithm. Journal of the ACM 22, 2 (Apr. 1975), 215-225.

Robert E. Tarjan and Jan van Leeuwen. 1984. Worst-case Analysis of Set Union Algorithms. Journal of the ACM 31, 2 (Mar. 1984), 245-281.

U.S. Appl. No. 14/069,255, filed Oct. 31, 2013, Guy L. Steele Jr.

U.S. Appl. No. 14/069,259, filed Oct. 31, 2013, David R. Chase.

* cited by examiner

SYSTEMS AND METHODS FOR IMPLEMENTING LOW-LATENCY LOOKUP CIRCUITS USING MULTIPLE HASH FUNCTIONS

BACKGROUND

1. Field of the Disclosure

This disclosure relates generally to computing devices that implement lookup tables, and more particularly to systems and methods for implementing configurable hash tables using hardware circuitry.

2. Description of the Related Art

Computer networking devices such as routers, switches, and network interface cards commonly rely on lookup tables in hardware circuitry to quickly access information associated with incoming data packets for purposes such as routing, filtering, or load-balancing. Lookup tables for network applications allow for the fast retrieval of data values associated with a key, where the key is a bit string that can be found in or computed based on data received in incoming packets. Lookup tables can map a set of such keys to a set of addresses in a memory holding data associated with the keys.

Many existing hardware approaches focus on lookup tables that solve the longest-prefix match problem, specifically for IP routing applications. Such approaches typically assume fixed key sizes and a static/fixed set of tables with fixed-size entries, and they typically emphasize high lookup rates over low latency for individual lookups. For example, some traditional hardware implementations of lookup tables include content-addressable memories (CAMs) or, more specifically, ternary content-addressable memories (TCAMs). CAMs are dedicated hardware circuits combining memory locations for key entries with comparator logic such that a given input key can be quickly compared to all key entries stored in the memory in parallel. If an input key is found, the CAM either directly returns data associated with the key or the index of the memory location the matching key is stored in. This index can then be used to access data associated with the key, for example, by using the index as an address into a separate static random access memory (SRAM) or a dynamic random access memory (DRAM).

TCAMs allow key entries to not only use bit values of 0 and 1, but a third, "don't care" value, X. A value of X specifies that the corresponding bit position is not to be compared to the input key, but is to be considered a match. Some applications require that, in case of multiple matches, the entry with the longest sequence of matching, non-X bits starting from the most significant bit, commonly known as the longest-prefix match, to be the entry that is returned. While TCAMs offer low access latencies, their memory capacity is generally lower than the capacities offered by standard SRAMs of equal chip size. This is largely due to the added comparator logic per memory location. Furthermore, the power consumption of TCAMs tends to be high, and the hardware design dictates a maximum key size.

Some more recent hardware implementations of large lookup tables targeted at solving the longest-prefix match problem leverage standard SRAM technology. These implementations often utilize tree-based data structures such as TRIEs (which are also known as digital trees or prefix trees) stored in SRAMs. In some existing implementations, TRIEs map the digits of the keys to nodes in a tree structure such that the lookup of a key is done by traversing the tree from its root to its leaf nodes, such that at every node, the next digit in the input key determines the next-level node until a leaf node is reached. The traversal of the tree for key lookups may require multiple accesses to SRAM memory. For example, for m-bit keys, TRIEs require O(m) memory accesses in the worst case. By using multiple SRAMs and techniques such as pipelining, tree-based implementations can match or exceed the lookup rates offered by TCAMs. On the other hand, approaches that depend on multiple SRAM accesses commonly lead to significantly higher latencies for individual key lookups.

Existing software approaches, including software algorithms for evaluating perfect hash tables, provide more flexibility than existing hardware approaches in terms of the number of tables, key sizes, and data entry sizes. However, these algorithms are typically designed for sequential processing (e.g. as a sequence of processor instructions), and do not lead to efficient, parallel circuit implementations. For example, software techniques for fast lookups commonly include data structures such as hash tables or, more specifically, perfect hash tables. However, existing software algorithms for key lookups typically do not yield practical hardware implementations of lookup tables, as they often require long sequences of steps, sequential integer arithmetic, and/or conditional processing, i.e., properties that do not allow for efficient parallel or pipelined processing in hardware.

An existing FPGA-based lookup circuit applies the techniques of Cuckoo Hashing to look up keys in a table pattern. This circuit uses a two-level table to accommodate variable-length patterns. One form of "universal hashing" that has been described computes a hash function of a bit-string by multiplying the bit string, regarded as a bit vector by a matrix of bits in order to compute a linear transformation of the bit vector. One class of hash functions that has been described relies on combining the results of two or more primary hash functions, with the primary hash functions being regarded as mapping a set of keys into a graph or hypergraph.

SUMMARY

The systems and methods described herein may in some embodiments implement programmable hash tables that provide low-latency access to data stored in memory. More specifically, the systems described herein may include hardware circuitry configured to implement lookup circuits. In various embodiments, these lookup circuits may evaluate hash functions that map a set of keys (e.g., bit strings) to a set of addresses in one or more lookup tables that hold data associated with the keys. As used herein, the terms "hash function evaluation circuit", and "lookup circuit" may be used somewhat interchangeably to refer to such hardware circuitry (or at least a portion thereof). In some embodiments, the hash functions that are implemented in the hardware circuitry may be selected for efficient evaluation in hardware circuitry, and these hash functions may be used to construct the lookup tables. In some embodiments, the hash functions may be pre-computed in software based on a fixed key set and representations of those hash functions may be transferred to hash tables in one or more memories within the hardware circuitry. The hardware circuitry may be configured to retrieve data associated with a hash of a given key that is presented as an input to the hardware circuitry.

In some embodiments, the hardware circuitry may include two or more hash function sub-circuits, each of which may be configured to apply a respective hash function to an input key value to produce a respective hash value. In some embodiments, the input key value may be represented by a bit vector. In some such embodiments, to apply a respective hash function to the input key value to produce a respective hash value, each of the hash function sub-circuits may be configured to multiply the input bit vector by a pre-defined bit matrix and to add a pre-defined constant bit vector to the result of the multiplication. The hash value may identify a location in the memory (e.g., an entry in a lookup table) that stores a data value associated with the hash value. The hash value may be useable to access the data value stored in the identified location, and the data value may or may not be associated with the received input key value. In some embodiments, data representing the key associated with each data value may be stored along with its associated data value in the lookup table (e.g., as a key-value pair).

In some embodiments, the hardware circuitry may include a selection sub-circuit that is configured to receive (or to obtain) a respective data value associated with each of the hash values (e.g., from a lookup table in memory within the hardware circuitry) and to select one of the obtained data values (e.g., one that is associated with the received input key) to be output from the hardware circuitry. For example, the selection sub-circuit may be configured to determine which (if any) of the locations identified in the lookup table(s) stores a key that matches the input key, or stores data that is known to be associated with the input key. In some embodiments, at most one location in the lookup circuit stores a data value associated with a valid key.

In some embodiments, the lookup circuit may include two hash function sub-circuits, each of which provides a hash value to the same lookup table (e.g., to a separate input of a dual-ported memory that implements the lookup table). In other embodiments, each of the hash values may be provided to an input of a different single-ported memory that implements a lookup table specific to the corresponding hash function sub-circuit. In some embodiments, the lookup circuit may include more than two hash function sub-circuits, each of which produces a hash value usable to identify an entry in a lookup table. The hash function sub-circuits may be implemented and/or configured in a memory, using fixed combinatorial logic, using programmable combinatorial logic, or using a combination of these and/or other technologies, in different embodiments.

In some embodiments, the hardware circuitry may be configured to determine the validity of the keys that are presented as inputs and to provide a signal indicating the validity of each key and/or the resulting output data. In some embodiments, the contents of the lookup tables may be altered without modifying the underlying hardware of the hash function evaluation circuits. In some embodiments, the hardware circuitry may be configured to modify the data values obtained from the lookup table(s) prior to the selection of one of the data values for output, and may output the modified value of the selected data value rather than the value obtained from the lookup table.

Figure 1:
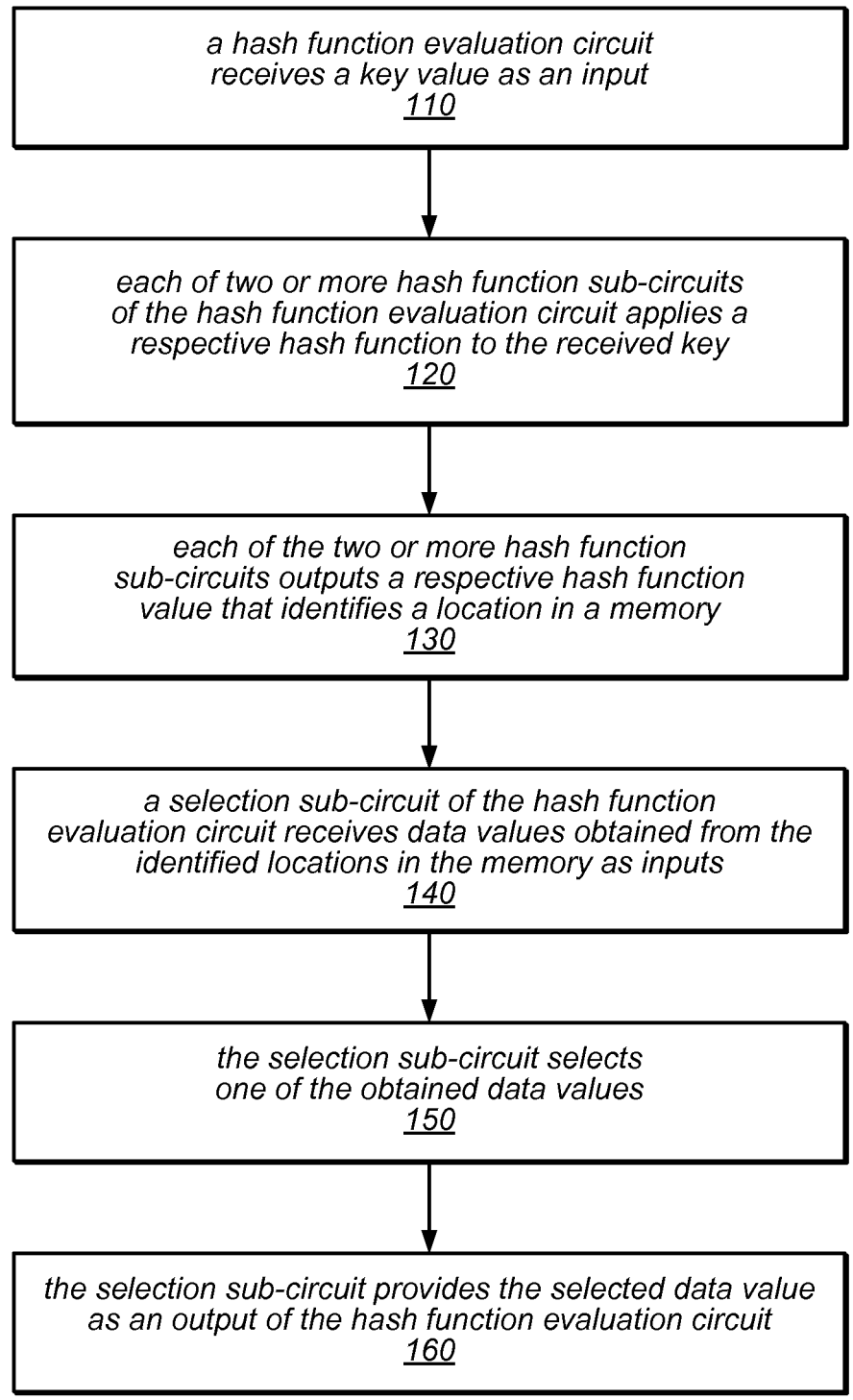
FIG. 1 is a flow diagram illustrating one embodiment of a method for evaluating a hash function.

While the disclosure is described herein by way of example for several embodiments and illustrative drawings, those skilled in the art will recognize that the disclosure is not limited to embodiments or drawings described. It should be understood that the drawings and detailed description hereto are not intended to limit the disclosure to the particular form disclosed, but on the contrary, the disclosure is to cover all modifications, equivalents and alternatives falling within the spirit and scope as defined by the appended claims. Any headings used herein are for organizational purposes only and are not meant to limit the scope of the description or the claims. As used herein, the word "may" is used in a permissive sense (i.e., meaning having the potential to) rather than the mandatory sense (i.e. meaning must). Similarly, the words "include", "including", and "includes" mean including, but not limited to.

DETAILED DESCRIPTION OF EMBODIMENTS

The systems and methods described herein may, in various embodiments, be used to implement configuring hash function circuitry and/or evaluating hash functions using such circuits. More specifically, the systems described herein may utilize hash functions (e.g., perfect hash functions, minimal perfect hash functions or other hash functions) targeted at efficient evaluation in hardware circuitry to construct lookup tables. In some embodiments, the hash functions may be pre-computed in software based on a fixed key set and then transferred into a hardware circuit. The circuit may store a representation of the hash functions in one or more hash tables and may be configured to retrieve and return data that is associated with various keys when they are presented to the circuit as inputs. In some embodiments, the circuit may also be configured to verify the validity of a presented key, update data associated with a key, insert new key/value pairs, and/or delete key/value pairs.

The hash function evaluation circuits described herein may be implemented in various circuit-level network processing devices including network interface cards, network processors, smart routers/switches, etc., according to different embodiments. For example, in some embodiments, these circuits may be implemented as part of an application-layer network device, such as a network device that is designed for low-latency processing of application messages in hardware. In general, the systems and methods described herein may be employed in a variety of applications that require the fast retrieval of information associated with at least one key per incoming message, in different embodiments.

In some embodiments, the system in which the circuits and techniques described herein are employed may be a user-programmable device. In such embodiments, the hash tables described herein may be generated based on a user-provided program and/or user-provided table data, which may not be known at circuit design time. In some embodiments, employing the circuits and techniques described herein may allow the user to create a variable number of hash tables, and each of the hash tables may support a different key size, a different number of keys, and/or differently-sized data entries associated with each key than other tables. This, in turn, may allow software to efficiently utilize the memory resources built into the circuit. In some embodiments, the user may define the various hash tables and/or lookup tables (including the valid keys for the table, the data associated with each of the valid keys, the maximum key size, the maximum number of keys supported, the number and/or size of the data words associated with the keys, and/or other parameters of the hash tables and/or lookup tables) in a domain-specific programming language. In other embodiments, the user may define a mapping between valid key values and associated data words (e.g., in a comma-separated values file), and program instructions may be used to determine the maximum key size, the number of keys supported, and the number and/or size of the data words associated with the keys, and to generate a hash function evaluation circuit configuration that implements a hash function (e.g., a minimal perfect hash function or another type of hash function) based on that information (which may include one or more hash tables, as described herein).

One common application in which the hash function evaluation circuits and techniques described herein may be employed is the mapping of Internet Protocol (IP) addresses to Ethernet addresses for the purpose of routing IP packets to their destinations across multiple hops in the network. Given short packets and the high bandwidth of network links, in these types of applications, table lookups may need to be executed at a rate high enough to sustain the link rate. For example, a 10 Gb/s Ethernet link may have a maximum packet arrival rate of almost 15 million packets per second at minimum packet size, requiring 15 million table lookups per second to make routing decisions in a timely manner. For some such IP routing applications, the mapping of IP addresses to Ethernet addresses may not only require a determination of whether an IP address is held in the key memory, but whether there exists at least one key entry for which at least some of the bits (e.g., at least some of the most significant bits) matches the input key.

As noted above, existing hardware implementations of lookup tables for routing applications typically focus on high lookup rates, require solving the longest-prefix match problem, and often rely on fixed key and data entry sizes (as given by IP and Ethernet addresses). However, for applications in some computer networking devices, e.g., those examining incoming data packets beyond the network-layer header, lookup tables with different properties may be desirable. In particular, some applications may not require solving the longest-prefix match problem, but may require low, deterministic lookup latencies, a potentially large number of entries, and/or keys and/or data entries of variable sizes. In some applications, it may be desirable to be able to partition available memory resources into multiple tables of variable key and/or data sizes, e.g., to efficiently utilize those memory resources.

A hash function H for a set K of m distinct keys, each having r bits, is a mapping function that maps each key k∈K to a p-bit integer i=H(k). If the hash function H always maps distinct keys to distinct integers (that is, $k_1 \neq k_2$ implies that $H(k_1) \neq H(k_2)$), then the mapping is called a perfect hash function (PHF). If, furthermore, the unique integers i produced by H for the m distinct keys form a set of consecutive integers, e.g., $0 \leq i \leq m-1$ for all i, the mapping is called a minimal perfect hash function (MPHF).

In some embodiments, given a hash function H for a key set K, the lookup of data associated with a key k may first require the evaluation of H(k) to compute a unique index i. The index i may then be used as an address into a memory holding a d-bit data entry D(k) associated with k. In some embodiments, the systems and methods described herein may be used to implement, in hardware circuitry, hash functions that can be evaluated in constant time for all keys k.

As noted above, an existing lookup circuit that is based on field programmable gate arrays, or FPGAs, uses the techniques of Cuckoo Hashing to look up keys in a table pattern uses a two-level table to accommodate variable-length patterns. In some embodiments, the lookup circuits described herein may use keys of fixed length and a single level of table lookup, which may reduce lookup latency when compared to existing techniques. In various embodiments, the lookup techniques described herein may differ from existing Cuckoo Hashing techniques in several other respects. For example, the existing FGPA-based circuit referenced above computes hash values sequentially, such that a lookup operation includes computing one hash function first, probing a table in memory, and making a decision about the results of that hash function before computing another hash function. In contrast, the lookup circuits described herein may compute multiple hash values in parallel (e.g., substantially concurrently).

For example, in various embodiments, the lookup circuits described herein may implement hash functions that need not be minimal perfect hash functions or even perfect hash functions. However, for hardware implementation, it may be desirable to choose hash functions that can be evaluated in constant time for all keys k. Therefore, in some embodiments, the lookup circuits described herein may implement two or more hash functions, each requiring roughly the same fixed amount of time to compute, which may allow them to be computed simultaneously in hardware. When a key is presented to the lookup circuit, each of the hash functions may be applied to the key. The resulting p-bit hash values may then be used as memory addresses in order to access key-value pairs stored in one or more memories. As described in more detail herein, at most one key-value pair stored in the memories of the circuit may be identified as matching a presented key, and the associated data in that key-value pair may be selected for output (e.g., the data associated with the presented key may be delivered or otherwise provided as an output of the lookup circuit as a result of the lookup operation). Note that in some embodiments, the outputs of two or more hash functions may be the same for a particular key, in which case they would identify the same (single) location in memory at which data associated with the particular key is stored.

One embodiment of a method for evaluating a hash function is illustrated by the flow diagram in FIG. 1. As illustrated at 110, in this example, the method may include a hash function evaluation circuit receiving a key value as an input. The method may include each of two or more hash function sub-circuits of the hash function evaluation circuit applying a respective hash function to the received key, as in 120. For example, the hash function sub-circuits may operate in parallel (e.g., substantially concurrently) to apply different hash functions to the input key. The method may include each of the hash function sub-circuits outputting a respective hash function value that identifies a location in a memory, as in 130.

As illustrated in this example, the method may include a selection sub-circuit of the hash function evaluation circuit receiving data values that are obtained from the identified locations in the memory as inputs to a selection operation, as in 140, and the selection sub-circuit selecting one of the obtained data values, as in 150. As described in more detail below, in some embodiments, the selected data value may or may not be associated with the received key value. However, none of the other obtained (but not selected) data values are associated with the received key value. As illustrated in FIG. 1, the method may include the selection sub-circuit providing the selected data value as an output of the hash function evaluation circuit, as in 160.

Another way in which the lookup circuits described herein may differ from the FPGA-based Cuckoo Hashing technique referenced above may be that the lookup circuits described herein do not employ the specific key-value pair insertion strategy typically employed by Cuckoo Hashing (i.e., the specific incremental approach to lookup table insertion and testing typically employed by Cuckoo Hashing). For example, in some embodiments of the lookup circuits described herein, software may be used to preprocess a set of key-value pairs by first building a graph in which each edge corresponds to a key-value pair and each node corresponds to the result of presenting a key to a hash function. This graph may then be tested to determine whether it is acyclic. If so, the lookup circuit may be able to successfully handle (e.g., evaluate) the set of key-value pairs. In other embodiments, software may be used to preprocess a set of key-value pairs by repeatedly generating candidate sets of hash functions and testing each such set to determine whether a graph constructed from the set of key-value pairs using that set of hash functions is acyclic. In such embodiments, when and if a set of hash functions is identified that produces an acyclic graph, those hash functions may be used in a lookup circuit such as those described herein to successfully handle (evaluate) the set of key-value pairs. In some embodiments, these techniques may be used to identify a set of hash functions for a lookup circuit such that each valid key in a particular set of key-value pairs can be mapped by the lookup circuit to a different location in a memory (i.e., one in which the data value for the corresponding key-value pair is stored).

Figure 2:
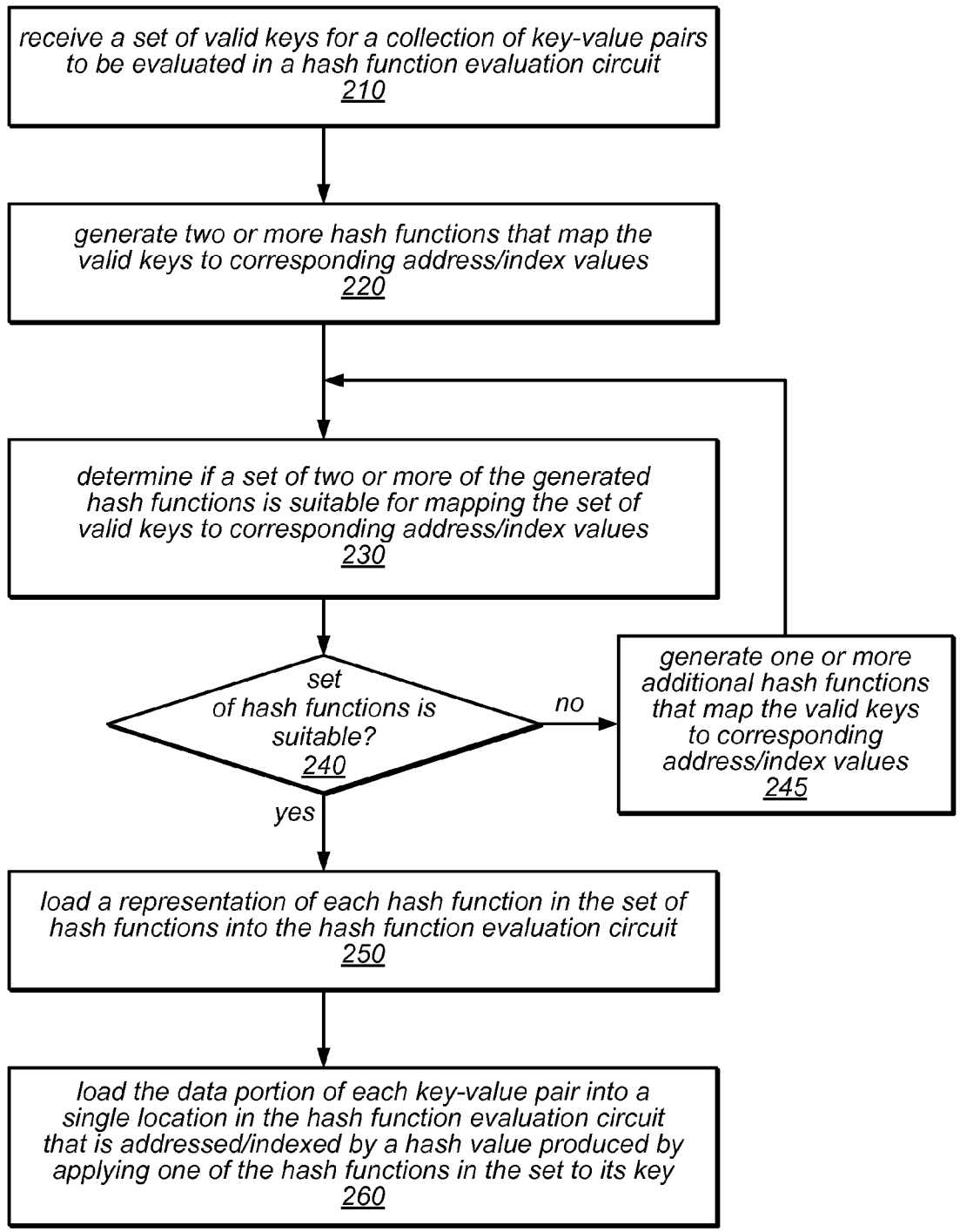
FIG. 2 is a flow diagram illustrating one embodiment of a method for loading a hash function evaluation circuit with a set of hash functions.

One embodiment of a method for loading a hash function evaluation circuit with a set of hash functions (e.g., a fixed number of hash functions corresponding to the number of hash function sub-circuits in the lookup circuit) is illustrated by the flow diagram in FIG. 2. As illustrated in this example, the method may include receiving a set of valid keys for a collection of key-value pairs to be evaluated in a hash function evaluation circuit, as in 210. The method may include generating two or more different hash functions that map the valid keys to corresponding address/index values, as in 220. The method may also include determining if a set of two or more of the generated hash functions is suitable for mapping the set of valid keys to corresponding address/index values, as in 230. For example, in embodiments in which the hash function evaluation circuit includes two hash function sub-circuits, the method may include determining whether a particular pair of the generated hash functions is suitable for mapping the set of valid key to corresponding address/index values, while in embodiments in which the hash function evaluation circuit includes three hash function sub-circuits, the method may include determining whether a particular set of three of the generated hash functions is suitable for mapping the set of valid key to corresponding address/index values.

Note that in different embodiments, the criteria used to determine whether the set of generated hash functions is suitable may vary dependent on the particular circuitry of the hash function evaluation circuit, various characteristics of the set valid keys or of the collection of key-value pairs, and/or the nature of the application in which the hash function evaluation circuit is employed. For example, in some embodiments, suitability may be determined based on whether a graph of the set of hash functions (e.g., a pair of hash functions) is acyclic, on whether the set of hash function is able to handle (e.g., evaluate) the set of key-value pairs for all valid keys (e.g., to produce exactly one unique address/index value for each valid key among the hash functions in the set), or on other suitability criteria.

As illustrated in this example, if it is determined that the set of hash functions is not suitable for use in the hash function evaluation circuit (shown as the negative exit from 240), the method may include generating one or more additional hash functions that map the valid keys to corresponding address/index values to be tested as part of a set of hash functions (e.g., as part of a pair or triplet of hash functions, depending on the number of hash function sub-circuits in the hash function evaluation circuit), as in 245. For example, in some embodiments, after one pair of hash functions has been tested and determined not to be suitable, the method may include generating another pair of hash function and testing it for suitability. However, if it is determined that the set of hash functions is suitable for use in the hash function evaluation circuit (or once a suitable set of hash functions has been identified), the method may include loading a representation of each of the hash functions in the set of identified set of hash functions into the hash function evaluation circuit (e.g., loading a representation of each of the hash functions into a respective hash function sub-circuit). This is illustrated in FIG. 2 by the positive exit from 240 and 250. The method may also include loading the data portion of each key-value pair into a single location in the hash function evaluation circuit that is addressed/indexed by a hash value produced by applying one of the hash functions in the set to its key, as in 260. For example, the method may include loading data for the key-value pairs into one or more lookup tables in one or more memories within the hash function evaluation circuit, in various embodiments.

In some embodiments of the systems described herein, each of the hash functions implemented in the lookup circuit may be defined through the multiplication of a respective bit matrix A of dimensions p×r by a key k that is represented as a bit vector k=($k_0, \ldots k_{r-1}$) of length r, followed by an addition of a respective bit vector, y=($y_0, \ldots, y_{p-1}$), of length p. In some embodiments, the addition may be performed modulo 2. In one such embodiment, the mathematical formula for the computation of a function H, where H may be one of two or more hash functions implemented in a lookup circuit, may be represented by Equation 1, shown below:

$$H(k) = A * k + y \qquad \text{Eqn. 1}$$

$$= \begin{pmatrix} a_{0,0} & \cdots & a_{0,r-1} \\ \vdots & \ddots & \vdots \\ a_{p-1,0} & \cdots & a_{p-1,r-1} \end{pmatrix} \begin{pmatrix} k_0 \\ \vdots \\ k_{r-1} \end{pmatrix} + \begin{pmatrix} y_0 \\ \vdots \\ y_{p-1} \end{pmatrix}$$

$$= \begin{pmatrix} a_{0,0}k_0 +_2 & a_{0,1}k_1 +_2 & \cdots & a_{0,r-1}k_{r-1} +_2 & y_0 \\ \vdots & \vdots & \ddots & \vdots & \vdots \\ a_{p-1,0}k_0 +_2 & a_{p-1,1}k_1 +_2 & \cdots & a_{p-1,r-1}k_{r-1} +_2 & y_{p-1} \end{pmatrix}$$

$$= \begin{pmatrix} h_0(k) \\ \vdots \\ h_{p-1}(k) \end{pmatrix}$$

In this example, the operator "$+_2$" represents modulo 2 addition, and the following are assumed:

$a_{i,j} \in \{0,1\}$ $k_i \in \{0,1\}$ $y_i \in \{0,1\}$ $h_i(k) \in \{0,1\}$

Figure 3:
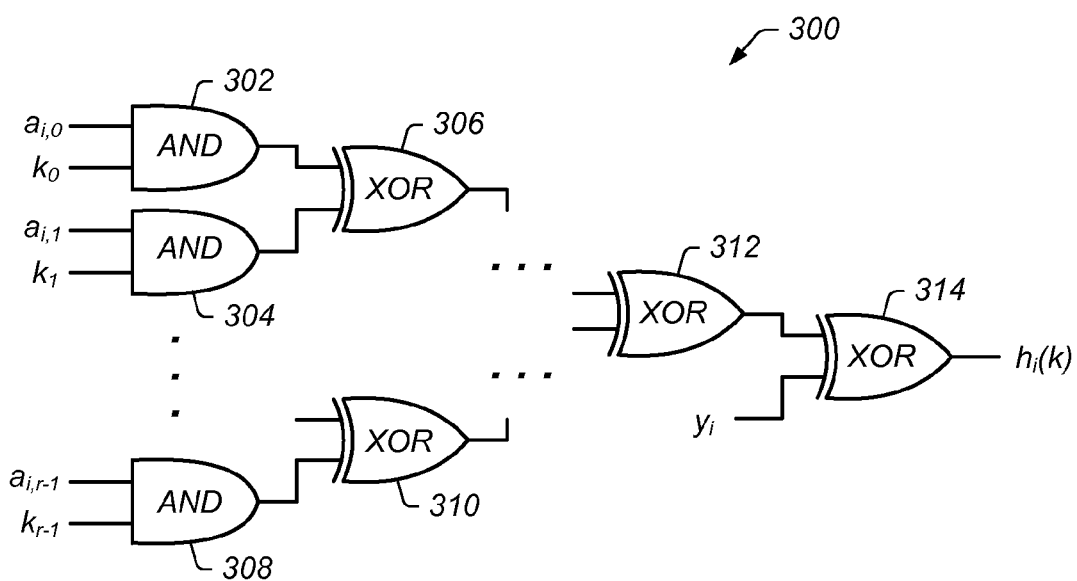
FIG. 3 is a block diagram illustrating a hardware circuit comprising AND gates and XOR gates that is configured to compute one bit of a hash function, according to one embodiment.

In some embodiments, the multiplication of two bits may be efficiently computed in hardware with an AND gate and the sum of two single-bit addends modulo 2 may be efficiently computed with an XOR gate. Hence, the sum of r single-bit addends modulo 2 may be computed with r−1 XOR gates. One such implementation is illustrated in FIG. 3, according to one embodiment. Specifically, FIG. 3 illustrates a hardware circuit 300 that includes multiple AND gates (including AND gates 302, 304, and 308) and a tree of XOR gates (including XOR gates 306, 310, 312, and 314) that are configured to compute one bit of H(k), as described above. In this example, the hardware circuit 300 is configured to compute bit $h_i(k)$ from the illustrated inputs (e.g., $a_{i,0}$ through $a_{i,r-1}$, and $k_0$ through $k_{r-1}$). To compute all p bits of function H, p parallel circuits similar to circuit 300 shown in FIG. 3 would be needed.

In general, with each of the lookup circuits described herein, a key is presented to an input of the circuit, and data associated with the key is provided at an output of the circuit. In some embodiments, an additional output signal may indicate whether or not the data provided at the output is valid. For some applications, it may be desirable for a lookup circuit not to be purely combinatorial, but to have alterable state. More specifically, it may be desirable for the lookup circuit to provide means for updating the set of key-value pairs in the lookup table. As described in more detail below, in some embodiments, the lookup circuit may implement additional inputs (e.g., a write signal and key/data input data) and may implement a mechanism to update the contents of the lookup circuit based on those inputs. For example, when the write signal is asserted, this may indicate that the information presented to the key/data input should be stored in the memory of the lookup circuit.

Figure 4A:
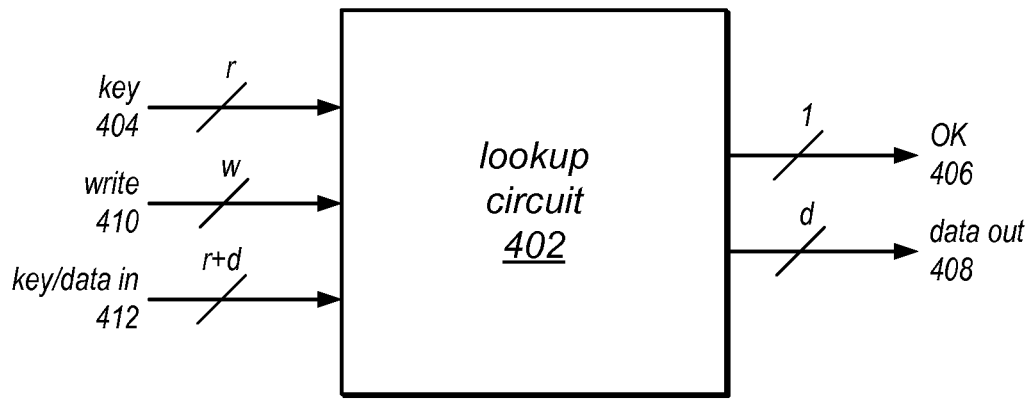
FIG. 4A is a block diagram illustrating an abstract representation of a combinatorial lookup circuit that accepts a key and produces a validity signal and output data, according to one embodiment.

FIG. 4A is a block diagram illustrating an abstract representation of a combinatorial lookup circuit, according to one embodiment. In this example, lookup circuit 402 is configured to accept as an input a key 404 (in this case, a bit string of length r) and to produce two outputs, namely a 1-bit validity signal 406 ("OK") that indicates whether the table contains a key-value pair whose key is equal to the input key 404), and d bits of associated data 408. In this example, if the validity signal 406 is true, then the associated data 408 is equal to the value in the key-value pair whose key was found to match the input key 404. However, if the validity signal 406 is false, then the associated data 408 may be any bit pattern (i.e., the data 408 may not be associated with the input key 404). In this example, the lookup circuit 402 also accepts two additional inputs, namely a set of w write signals 410 (where w may be 1 or more than 1), and (r+d) bits of key/data information 412. At a clock transition or other specific time, the key/data information 412 may be used to update the lookup table in a manner controlled by the write signals 410.

Figure 4B:
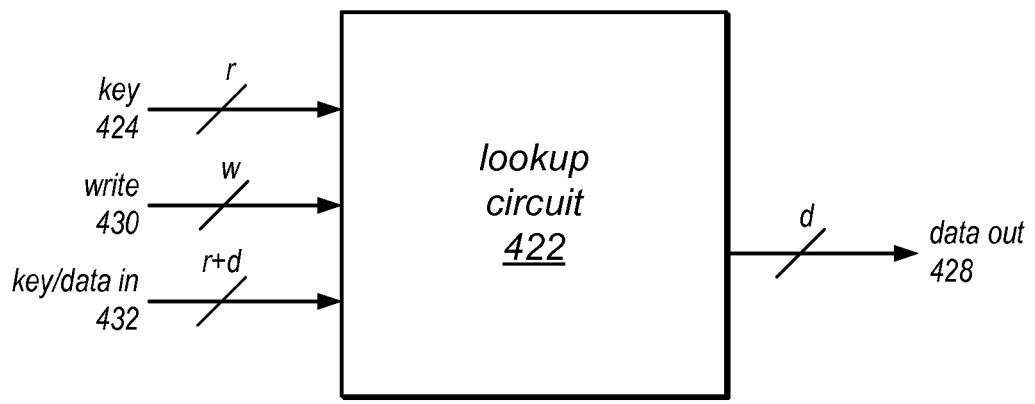
FIG. 4B is a block diagram illustrating an abstract representation of a combinatorial lookup circuit that accepts a key, one or more write signals and/or key/data information, and that produces output data, according to one embodiment.

In some applications, it may be desirable for a lookup circuit to provide means for updating the set of key-value pairs in the lookup table, but it may be known that a matching key-value pair will always be present in the lookup table for all possible input keys. In such embodiments, it may not be necessary for the lookup circuit to produce a validity signal, since in practice the produced signal should always be true. FIG. 4B is a block diagram illustrating an abstract representation of one such lookup circuit, according to one embodiment. In this example, combinatorial lookup circuit 422 is configured to accept as an input a key 424 (in this case, a bit string of length r) and to produce one output, namely d bits of associated data 428. In this example, the lookup circuit 422 also accepts two additional inputs, namely a set of w write signals 430 (where w may be 1 or more than 1), and (r+d) bits of key/data information 432. At a clock transition or other specific time, the key/data information 432 may be used to update the lookup table in a manner controlled by the write signals 430.

Figure 5:
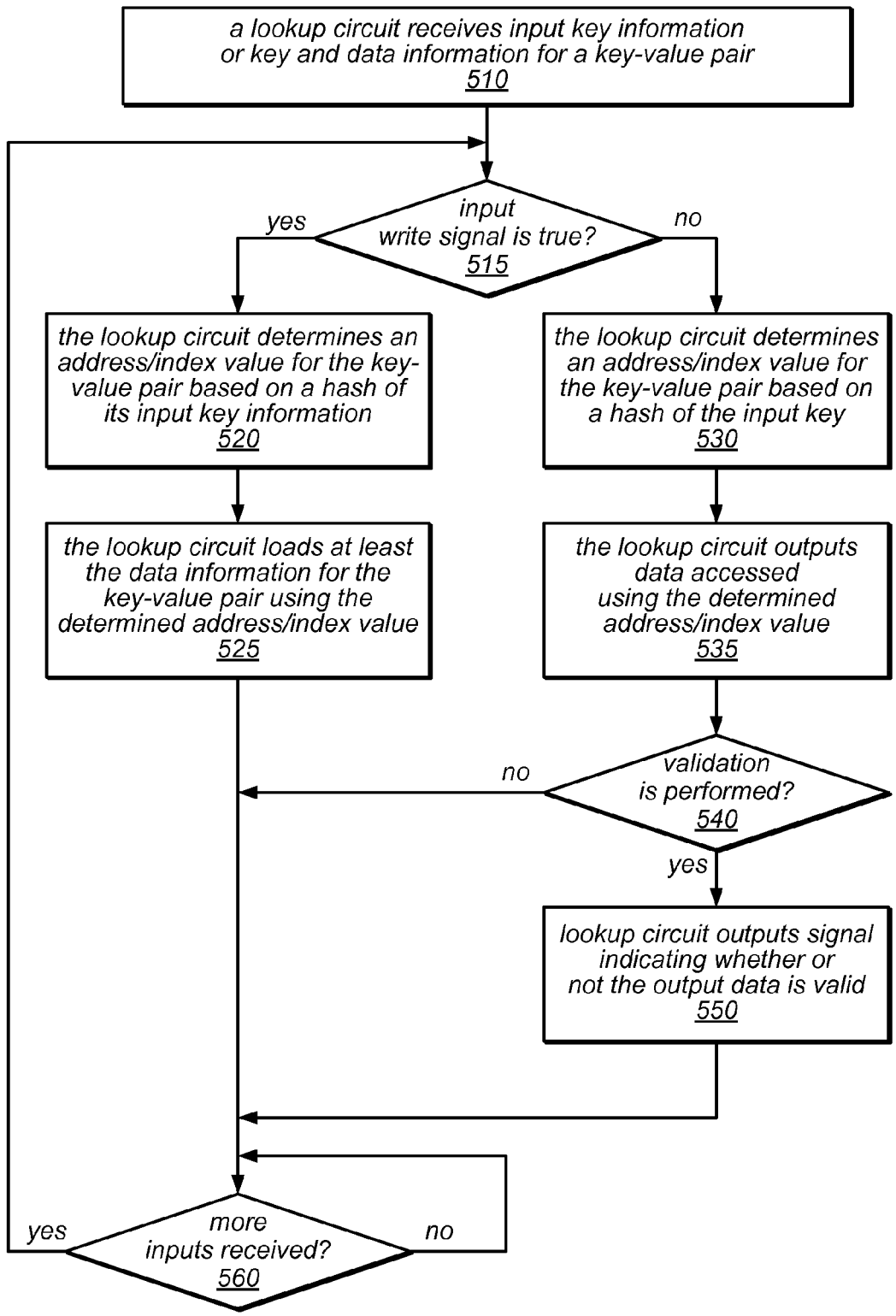
FIG. 5 is a flow diagram illustrating one embodiment of a method for accessing data in a lookup circuit for reading or writing.

One embodiment of a method for accessing data in a lookup circuit for reading or writing (e.g., to load or re-load data for one or more key-value pairs in a lookup circuit) is illustrated by the flow diagram in FIG. 5. As illustrated at 510, in this example, the method may include a lookup circuit receiving input key information or key and data information for a key-value pair. If an input write signal is true (shown as the positive exit from 515), this may be indicative of an operation for loading (or re-loading) at least one location in which data for a key-value pair is stored in the lookup circuit. In this case, the method may include the lookup circuit determining an address/index value for the key-value pair based on a hash of its input key information (as in 520), and loading at least the data information for the key-value pair using the determined address/index value (as in 525). For example, in some embodiments, the method may include applying two or more hash functions in a set of hash functions that are implemented in the lookup circuit to the input key information. One of the resulting hash values may be used as an address/index value that identifies an entry in a lookup table or another data structure in a memory (or an address/index value usable to select another type of storage element such as a register, or an element in programmable combinatorial logic) that is to be loaded with (or updated with) the input data information (i.e., data that is associated with the input key information).

In some embodiments, applying two or more hash functions to the input key information may result in identifying two or more potential locations in the lookup circuit in which the input data information can be stored and from which it can subsequently be retrieved. In addition, several keys might hash to the same location, in some embodiments. As previously noted, the lookup circuit may be configured to store data for each key-value pair in only a single location (e.g., in a single entry of a lookup table or other data structure). In such embodiments, the loading process may be configured to choose one of the potential locations identified by the hash values of the input key and to store the input data information in the chosen location. For example, when the loading process attempts to insert data for a particular key-value pair into a lookup table at one of the locations identified by the hashes of the input key, if that location has already been loaded with data for another key-value pair, the loading process may store the data for the particular key-value pair in another one of the locations identified by the hashes of the input key. In some embodiments, the input key information may be stored in the entry of the lookup table or other data structure along with the data information. In other embodiments, the input key information may be stored elsewhere in the lookup circuit (in association with the input data information) or may not be stored in the lookup circuit.

As illustrated in this example, if the input write signal is not true (shown as the negative exit from 515), this may be indicative of an operation for reading a data value from the location in which data for a key-value pair is stored in the lookup circuit. For example, in some embodiments, only one location in the lookup circuit stores a data value that is associated with each of the valid keys (i.e., the keys that are mapped to respective data values stored in the lookup circuit). In this case, the method may include the lookup circuit determining an address/index value for the key-value pair based on a hash of the input key information (as in 530), and outputting data accessed using the determined address/index value (as in 535). For example, in some embodiments, the method may include applying two or more hash functions in a set of hash functions that are implemented in the lookup circuit to the input key information. One of the resulting hash values may be used as an address/index value that identifies an entry in a lookup table or another data structure in a memory (or an address/index value usable to select another type of storage element such as a register, or an element in programmable combinatorial logic) in which the data value that is associated with the input key information is stored. In some embodiments, the key information for the key-value pair represented by the entry may be stored in the entry of the lookup table or other data structure along with the data information. In other embodiments, the key information for the key-value pair represented by the entry may be stored elsewhere in the lookup circuit (in association with the data information for the key-value pair) or may not be stored in the lookup circuit. In some embodiments, the lookup circuit may output the key information for the key-value pair that was stored in the lookup circuit when accessing the data information for the key-value pair (e.g., in embodiments in which validation is performed, as described herein).

As illustrated in this example, if the lookup circuit is configured to perform a validation operation (shown as the positive exit from 540), the method may include the lookup circuit outputting a signal indicating whether or not the output data is valid (as in 550). However, in embodiments in which the lookup circuit is not configured to perform a validation operation (shown as the negative exit from 540), this operation may be skipped and no validation signal will be output by the lookup circuit. As illustrated in this example, until and unless additional inputs are received, there may be nothing for the lookup circuit to evaluate. This is illustrated in FIG. 5 by the feedback from the negative exit of 560 back to the input of 560. However, when and if any additional inputs are received, the method may include repeating the operations illustrated as 515-550 for any additional inputs. This is illustrated in FIG. 5 by the feedback from the positive exit of 560 to 515. Note that in some embodiments, in order to load data and/or key information for multiple key-value pairs into the lookup circuit, the operations illustrated in 520 and 525 may be repeated in a loop (e.g., once per clock cycle) while the value of the write input signal is held true and a series of input values are received, e.g., changing with each clock cycle (not shown).

In some embodiments of the lookup circuits described herein, for each input key that is received, two hash function sub-circuits may be configured to apply respective hash functions to the key, and the resulting hash values may be used to look up data stored in two locations in the memory. The lookup circuit may include a selection sub-circuit (sometimes referred to herein as a selector) that chooses one of those two pieces of data to be provided as an output of the lookup circuit. In some embodiments, the selection of one of the two pieces of data may be controlled by (or at least dependent on) the output of a comparator that is also used in deriving a validity signal, as described herein. In some embodiments, the lookup circuit may include a dual-ported memory (e.g., a dual-ported RAM) in which valid data is stored along with the key with which it is associated. In such embodiments, the two pieces of data are retrieved from the dual-ported memory by presenting each of the two hash values at a different one of the two input ports of the memory, and each of the two key/value pairs is output at a corresponding one of the two output ports of the memory. As previously noted, in some embodiments, at most one of the two pieces of data will include (or be associated with) a key that matches the input key. In such embodiments, the loading process will have chosen to store the data (and also, in some cases, the key) for that key-value pair in one of the two locations identified by the two hash values computed for the input key, and the other location may store data associated with another key that happens to hash to one of the same hash values as the input key.

In some embodiments, in order to determine which of the two pieces of data to provide as an output, the lookup circuit may be configured to determine which of the two locations identified by hashes of the input key contains a key that matches the input key (i.e., which of the two locations is the one into which the loading process decided to store the key-value pair corresponding to the input key). Note that because the loading process described herein results in two (or more) potential locations in which to store data for each key-value pair, in some embodiments, lookup circuits that employ this approach may be able to store data for more keys than lookup circuits that employ other loading schemes. For example, in some other lookup circuits in which multiple keys can hash to the same value (but in which there can be only one location per hashed value), when the loading process attempts to store data for a particular key-value pair in a location identified by a hash of its key, data associated with another key might already be stored there.

In some embodiments of the lookup circuits described herein, when an input key is presented to the circuit, it may be fed to two hash function sub-circuits, the outputs of which will identify respective locations in memory (e.g., in a lookup table or other data structure configured to store information for key-value pairs). In some such embodiments, the identified locations will always (or nearly always) be two different locations. In these embodiments, if the input key and its associated data are stored in the table, the loading process will see to it that they will be stored in one of the two locations that are identified by the outputs of the two hash function sub-circuits. However, because of the nature of hash functions, there may be some chance that the two hash functions will collide. If they do collide, data will be read from the same location twice (e.g., using the identical hash values computed by both hash functions). Note that if there are too many keys in the set of valid key-value pairs that hash to the same hash values (and memory locations), the loading function may fail and a different pair of hash functions may need to be implemented in the lookup circuit to handle the set of valid key-value pairs. In other words, there may be a trade-off to be made in that if there are not too many collisions, the loading process described herein (one that includes the application of multiple hash functions to each input key) may allow a lookup circuit to succeed where another (e.g., a lookup circuit that implements only use one hash function) would not. Several variations of lookup circuits that employ the techniques described herein are illustrated in FIGS. 6, 7, 9, 10, 11, and 13, according to different embodiments.

Figure 6:
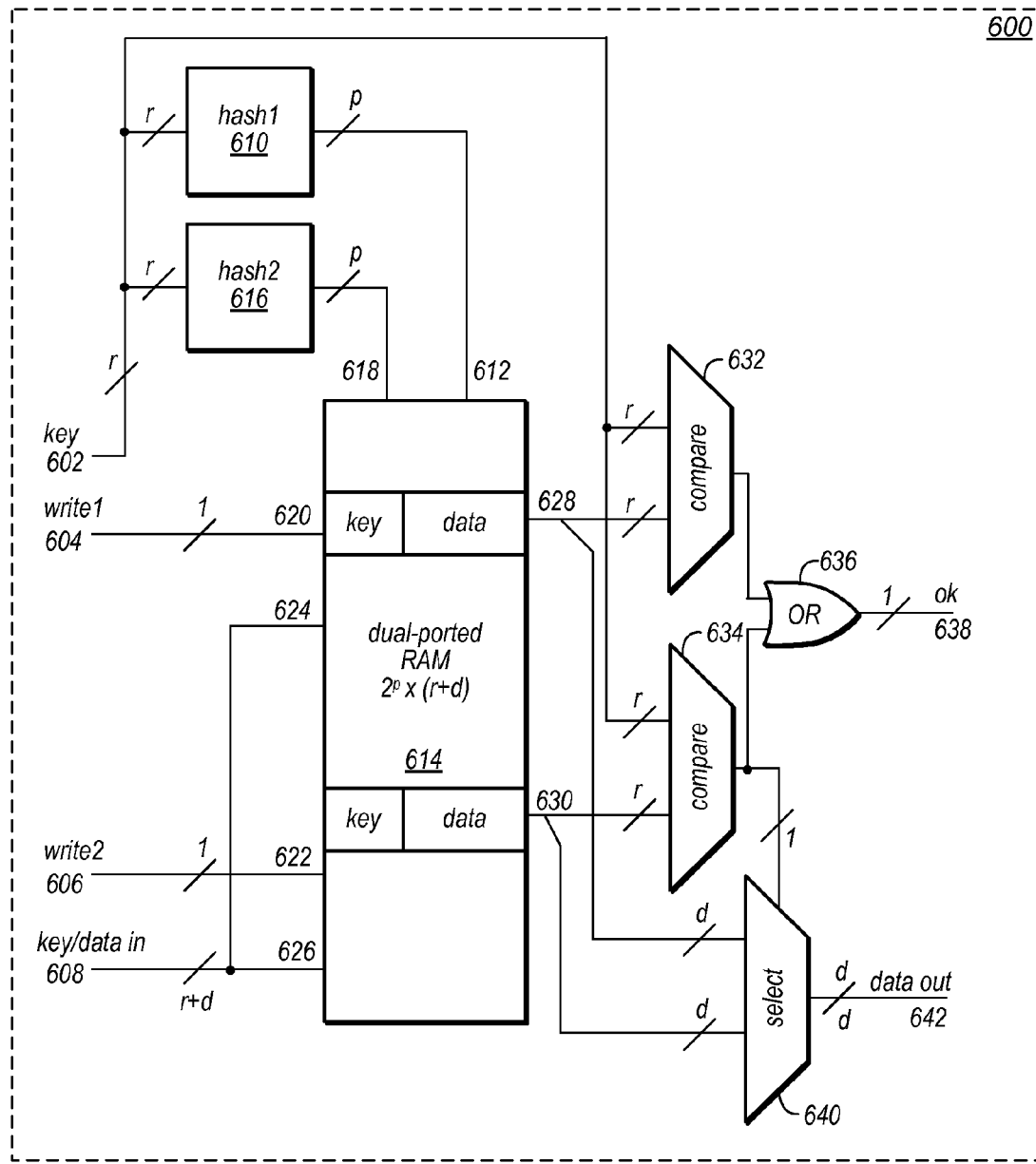
FIG. 6 is a block diagram illustrating a lookup circuit that accepts inputs and produces outputs in the same manner as the abstract lookup circuit illustrated in FIG. 4A, according to one embodiment.

FIG. 6 is a block diagram illustrating a lookup circuit that is configured to accept inputs and to produce outputs in the same manner as the abstract circuit 402 shown in FIG. 4A, according to one embodiment. In this example, lookup circuit 600 is configured to accept as an input a key 602 (a bit string of length r), corresponding to the input key 404 of FIG. 4A. The lookup circuit 600 is also configured to accept a first 1-bit write signal 604 and a second 1-bit write signal 606, which together correspond to the write signals 410 of FIG. 4A (with w=2). In this example, lookup circuit 600 is also configured to accept r+d bits of key/data input information 608, corresponding to the key/data inputs 412 of FIG. 4A.

The lookup circuit 600 includes a first hash function sub-circuit 610 that is configured to accept the key 602 and to produce a p-bit output that is connected to a first address input 612 of a dual-ported RAM 614. In this example, the first address input 612 of the dual-ported RAM 614 is at least p bits wide. In some embodiments, the first hash function sub-circuit 610 may be implemented as p copies of the circuit shown in FIG. 3, using a bit matrix A1 and a bit vector y1. In this example, the lookup circuit 600 also includes a second hash function sub-circuit 616 that is configured to accept the key 602 and to produce a p-bit output that is connected to a second address input 618 of the dual-ported RAM 614. In this example, the second address input 618 of the dual-ported RAM 614 is at least p bits wide. In some embodiments, the second hash function sub-circuit 616 may be implemented as p copies of the circuit shown in FIG. 3, using a bit matrix A2 and a bit vector y2, where A2 may be the same as A1 or may be different from A1, and y2 may be the same as y1 or may be different from y1.

In lookup circuit 600, the first write signal 604 is connected to a first write-enable input 620 of the dual-ported RAM 614, and the second write signal 606 is connected to a second write-enable input 622 of the dual-ported RAM 614. In this example, the r+d bits of key/data input information 608 are connected to each of a first write-data input port 624 of the dual-ported RAM 614 and a second write-data input port 626 of the dual-ported RAM 614. In this example, dual-ported RAM 614 contains at least $2^p$ words of memory, where each word holds at least r+d bits. In some embodiments, a dual-ported RAM such as 614 dual-ported RAM may be configured to operate, at a clock transition or other specific time, to accept data from the first write-data input port 624 and to write that data into a memory word at an address selected by the p-bit bit string presented at the first address input 612, provided that the first write enable input 620 is true. However, if the first write-enable input 620 is false, then the data from the first write-data input port 624 will not be written to the memory. Similarly, the dual-ported RAM 614 may be configured to operate, at a clock transition or other specific time, to accept data from the second write-data input port 626 and to write that data into a memory word at an address selected by the p-bit bit string presented at the second address input 618, provided that the second write enable input 622 is true. However, if the second write-enable input 620 is false, then the data from the second write-data input port 626 will not be written to the memory. In some embodiments, the lookup circuit 600 may be operated in a manner such that the first write signal 604 and the second write signal 606 are never both true at the same time.

In lookup circuit 600, the dual-ported RAM 614 includes a first read-data output port 628, and the dual-ported RAM 614 may be configured to operate, at a clock transition or other specific time, to read a memory word from an address selected by the p-bit bit string presented at the first address input 612, and to present r+d bits of data from that memory word to the first read-data output port 628 (where the leftmost r bits represent the key of a key-value pair and the remaining d bits represent the corresponding data for the key-value pair). In this example, the dual-ported RAM 614 also has a second read-data output port 630, and the dual-ported RAM 614 may be configured to operate, at a clock transition or other specific time, to read a memory word from an address selected by the p-bit bit string presented at the second address input 618 and to present r+d bits of data from that memory word to the second read-data output port 630 (wherein again, the leftmost r bits represent the key of a key-value pair and the remaining d bits represent the corresponding data for the key-value pair).

In this example, the lookup circuit 600 includes two comparators that are configured to determine whether a key-value pair corresponding to the input key is stored in the dual-ported RAM 614. For example, lookup circuit 600 includes a first r-bit comparator 632 that has a first input port connected to the key input 602 and a second input port connected to the leftmost r bits of the first read-data output port 628 of the dual-ported RAM 614. In this example, comparator 632 may be configured to produce a 1-bit signal indicating whether its two input ports have matching data. In this example, lookup circuit 600 includes a second r-bit comparator 634 that has a first input port connected to the key input 602 and a second input port connected to the leftmost r bits of the second read-data output port 630 of the dual-ported RAM 614. In this example, comparator 634 may be configured to produce a 1-bit signal indicating whether its two input ports have matching data. As illustrated in FIG. 6, the lookup circuit 600 also includes a two-input OR gate 636 whose inputs are connected to the respective output signals of comparator 632 and comparator 634. In this example, the output of the OR gate 636 is the validity signal 638 of the lookup circuit 600, which may correspond to the validity signal 406 in FIG. 4A. In this example, the comparator 632, the comparator 634, and the OR gate 636 may be configured to produce a value of true for the validity signal 638 if and only if either of the read-data output port 628 and the read-data output port 630 is presenting r+d bits of data of which the leftmost r bits match the input key 602.

In the example, illustrated in FIG. 6, if either of the locations within dual-ported RAM 614 identified by address inputs 612 and 618 contains a key that matches the input key 602, then that location must contain the correct data for the input key 602. In some embodiments, the key-value information may be loaded into the memory in a manner such that the correct data associated with every valid key will be stored in dual-ported RAM 614. In such embodiments, if the input key 602 does not match any valid key in the dual-ported RAM 614 (i.e., if the input key 602 does not match the key in either of the locations identified by the results of the two hash functions), the validity signal 638 will be false, indicating that there is no entry in the lookup circuit for that key. This may mean that an invalid key was presented, since all valid keys should be represented in the memory. In some embodiments, if the validity signal 638 is true, then at least one of the comparators (i.e., 632 and/or 634) found a match. Note that in some embodiments, comparators 632 and 634 might both find a match in the rare case that the two hash functions map to the same location in the memory. However, this may still result in outputting the correct output data (shown as 642), assuming that the key stored in that location matches the input key 602.

In some embodiments, the comparator 632 may be configured to compare two keys by delivering a true signal if and only if the bit strings presented to its two input ports match exactly. In an alternate embodiment, the comparator 632 may be configured to compare two keys by delivering a true signal if and only if the bit strings presented to its two input ports match according to some other criterion, such as whether the bit strings represent character sequences that match if distinctions of alphabetic case (such as uppercase versus lowercase) are ignored. It will be appreciated that the use of other comparators that employ other matching criteria is also possible and falls within the spirit and scope of this disclosure. It will also be appreciated that similar alternatives may be used for the comparator 634.

As illustrated in FIG. 6, the lookup circuit 600 includes a selector 640. In this example, selector 640 has a first d-bit input port connected to the rightmost d bits of the first read-data output port 628 of the dual-ported RAM 614, a second d-bit input port connected to the rightmost d bits of the second read-data output port 630 of the dual-ported RAM 614, and a 1-bit control signal connected to the output signal of the second comparator 634. In this example, the output of the selector 640 is the d-bit associated data output 642 of the lookup circuit 600, corresponding to the associated data output 408 in FIG. 4A. In some embodiments, selector 640 and comparator 634 may be configured to deliver the rightmost d bits of the second read-data output port 630 of the dual-ported RAM 614 to the associated data output 642 whenever the key 602 matches the leftmost r bits of the second read-data output port 630 of the dual-ported RAM 614, and to deliver the rightmost d bits of the first read-data output port 628 of the dual-ported RAM 614 to the associated data output 642 whenever the key 602 does not match the leftmost r bits of the second read-data output port 630 of the dual-ported RAM 614.

In some embodiments, external circuitry, which may be under software control, may be configured to write a specific key-value pair to a memory location in the dual-ported RAM 614 by presenting the key to key input 602, presenting the key and value together to key/data input 608, and presenting a true signal to the first write-enable input 604. In such embodiments, in response to receiving these inputs, the lookup circuit 600 may be configured to operate, at a clock transition or other specific time, to write the key-value pair presented to the key-data input 608 to a memory location determined by the first hashing function sub-circuit 610 from the key 602. Similarly, external circuitry, which may be under software control, may also be configured to write a specific key-value pair to another (possibly different) memory location in the dual-ported RAM 614 by presenting the key to key input 602, presenting the key and value together to key/data input 608, and presenting a true signal to the second write-enable input 606. In response to receiving these inputs, the lookup circuit 600 may be configured to operate, at a clock transition or other specific time, to write the key-value pair presented to the key-data input 608 to a memory location determined by the second hashing function sub-circuit 616 from the key 602.

In some embodiments, external circuitry, which may be under software control, may be configured to effectively delete a key-value pair from the memory in the dual-ported RAM 614 by presenting the key to key input 602, presenting a different key and an arbitrary value together to key/data input 608, and presenting a true signal to the first write-enable input 604. In this case, the lookup circuit 600 may be configured to operate, at a clock transition or other specific time, to write the different key and the arbitrary value presented to the key-data input 608 to a memory location determined by the first hashing function sub-circuit 610 from the key 602. External circuitry, which may be under software control, may also be configured to effectively delete a key-value pair from the memory in the dual-ported RAM 614 by presenting the key to key input 602, presenting a different key and an arbitrary value together to key/data input 608, and presenting a true signal to the second write-enable input 606. In this case, the lookup circuit 600 may be configured to operate, at a clock transition or other specific time, to write the different key and the arbitrary value presented to the key-data input 608 to a memory location determined by the second hashing function sub-circuit 616 from the key 602. In each case, if the different key is chosen to be a specific bit pattern that will not match any key intended to be presented as key input 602, then the contents of the memory word after it is written will not match the input key 602 on any future lookup request.

In some embodiments, external circuitry, which may be under software control, may be configured to effectively query the lookup circuit 600 to find out whether it contains associated data for a specific key k by presenting the key k to key input 602. In this case, the lookup circuit 600 may be configured to operate, at a clock transition or other specific time, to examine a first memory location within the dual-ported RAM 614 determined by the first hashing function sub-circuit 610 from the key 602, and also to examine a second memory location within the dual-ported RAM 614 determined by the second hashing function sub-circuit 616 from the key 602. The lookup circuit 600 may then operate to assert true for validity signal 638 if and only if either the first examined memory location or the second examined memory location contains a key (e.g., in the leftmost r bits) that matches key input 602. The lookup circuit 600 may also operate to deliver to associated data output 642 the rightmost d bits of the second examined memory location if and only if the second examined memory location contains a key (e.g., in the leftmost r bits) that matches key input 602. The lookup circuit 600 may also operate to deliver to associated data output 642 the rightmost d bits of the first examined memory location if and only if the second examined memory location contains a key (e.g., in the leftmost r bits) that does not match key input 602. In other words, if validity signal 638 is true, then the associated data output 642 will present a d-bit value that is part of a key-value pair in the memory of the dual-ported RAM 614 whose key matches the key presented to key input 602.

In some embodiments, lookup circuit 600 (and/or other ones of the lookup circuits described herein) may be intended for use within a larger system that makes appropriate decisions, for each key-value pair, as to whether to assert the first write-enable signal 604 or the second write-enable signal 606 when storing a key-value pair into the lookup circuit 600. For example, external circuitry, which may be under software control, may be configured to implement a loading process such as that described herein to load a collection of key-value pairs into a memory in the lookup circuit. Because each key-value pair can be stored into only one of two memory locations, not every set of key-value pairs can be successfully stored in its entirety into the lookup circuit 600. However, in embodiments in which a collection of valid key-value pairs can be successfully stored into the lookup circuit 600, then the lookup circuit 600 can be used to perform queries directed to those key-value pairs rapidly, e.g., in constant time.

Note that in some embodiments, the hash function sub-circuits 610 and 616 may be "hard-wired," that is, fixed and unchanging. For example, each of them may be implemented as a hardware circuit such as the one illustrated in FIG. 3. In an alternate embodiment, the hash function sub-circuits 610 and 616 may be implemented according to Equation 1 shown above, but using a circuit that includes a writable memory that contains information specifying the bit matrix A and the bit vector y. In another alternate embodiment, the hash function sub-circuits 610 and 616 may be implemented in a manner other than that specified in Equation 1 shown above, using a circuit that includes a writable memory that allows the precise behavior of the hash function sub-circuits to be altered under external control. In various alternate embodiments, external software may be configured to examine a set of key-value pairs, choose a pair of hash functions suitable for use in evaluating those key-value pairs, update the writable memory associated with each of the hash function sub-circuits 610 and 616 so that they will operate in a manner consistent with the chosen hash functions, and then proceed to write the key-value pairs into the memory of the dual-ported RAM 614. This approach may allow a greater number of sets of key-value pairs to be successfully handled by the lookup circuit 600 than in existing lookup circuits because the behavior of the hash functions may be customized for any particular set of key-value pairs.

Figure 7:
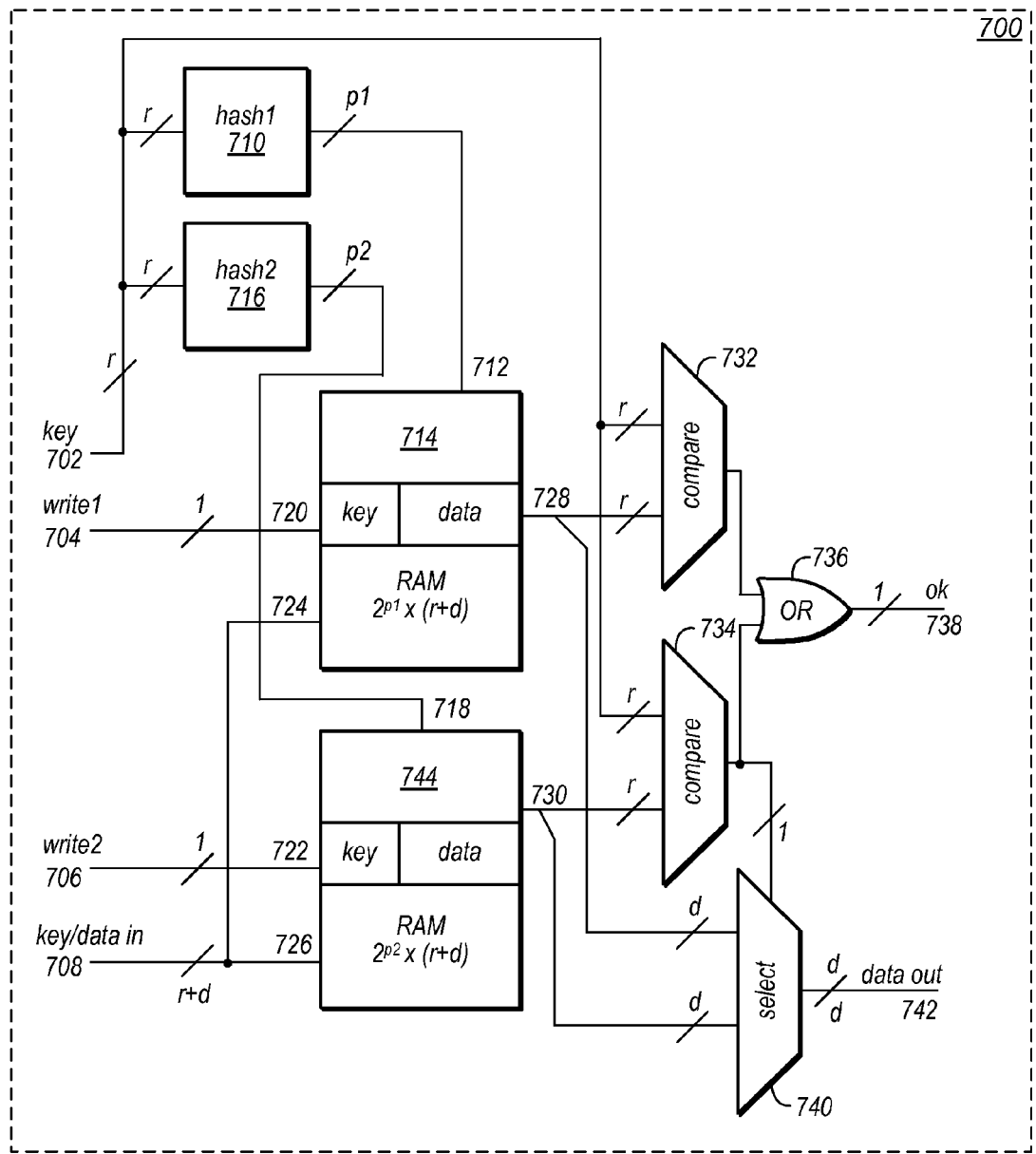
FIG. 7 is a block diagram illustrating a lookup circuit that includes two single-ported RAMs, according to one embodiment.

Several variations of the lookup circuit 600 are illustrated in FIGS. 6, 7, 9, 10, 11, and 13, according to different embodiments. For example, FIG. 7 illustrates a lookup circuit that includes two single-ported RAMs (e.g., one for each hash function sub-circuit), rather than one dual-ported RAM. More specifically, FIG. 7 is a block diagram illustrating a lookup circuit that is configured to accept inputs and to produce outputs in the same manner as the abstract circuit 402 shown in FIG. 4A, according to one embodiment. The lookup circuit 700 is similar to the lookup circuit 600. However, the dual-ported RAM 614 of lookup circuit 600 has been replaced in lookup circuit 700 with a first single-ported RAM 714 and a second single-ported RAM 744. In this example, the single-ported RAM 714 contains at least $2^{p1}$ words of memory, where each word holds at least r+d bits, and the single-ported RAM 744 contains at least $2^{p2}$ words of memory, where each word holds at least r+d bits. In addition, the first hash function sub-circuit 610 of lookup circuit 600 has been replaced in lookup circuit 700 with a first hash function sub-circuit 710 that is configured to accept a key 702 and to produce a p1-bit output that is connected to an address input 712 of the first single-ported RAM 714. Similarly, the second hash function sub-circuit 616 of lookup circuit 600 has been replaced with a second hash function sub-circuit 716 that is configured to accept the key 702 and to produce a p2-bit output that is connected to an address input 718 of the second single-ported RAM 744. In this example, the address input 712 of the first single-ported RAM 714 is at least p1 bits wide, and the address input 718 of the second single-ported RAM 714 is at least p2 bits wide. In some embodiments of the lookup circuit 700, p1 may be equal to p2, while in other embodiments, p1 may not be equal to p2.

In this example, lookup circuit 700 contains other circuit elements (e.g., write-data input ports 724 and 726, read-data output ports 728 and 730, comparator 732, comparator 734, OR gate 736, and selector 740) that may correspond in their behavior, connections, and purpose to similarly numbered circuit elements of the lookup circuit 600 (e.g., write-data input ports 624 and 626, read-data output ports 628 and 630, comparator 632, comparator 634, OR gate 636, and selector 640). Similarly, lookup circuit 700 includes inputs and outputs (e.g., write inputs 720 and 722, key/data input 708, validity signal 738, and data output 742) that may correspond in their behavior, connections and purpose to similarly numbered inputs and outputs of lookup circuit 600 (e.g., write inputs 620 and 622, key/data input 608, validity signal 638, and data output 642). In this example, the operation and behavior of the lookup circuit 700 may be substantially similar to the behavior of the lookup circuit 600 in its ability to insert and delete key-value pairs and to query the lookup table for a key-value pair matching a given key. It will also be appreciated that the lookup circuit 700, because of its use of two separate memories that may be of different sizes, may be successful in handling sets of key-value pairs other than those successfully handled by the lookup circuit 600.

Figure 8:
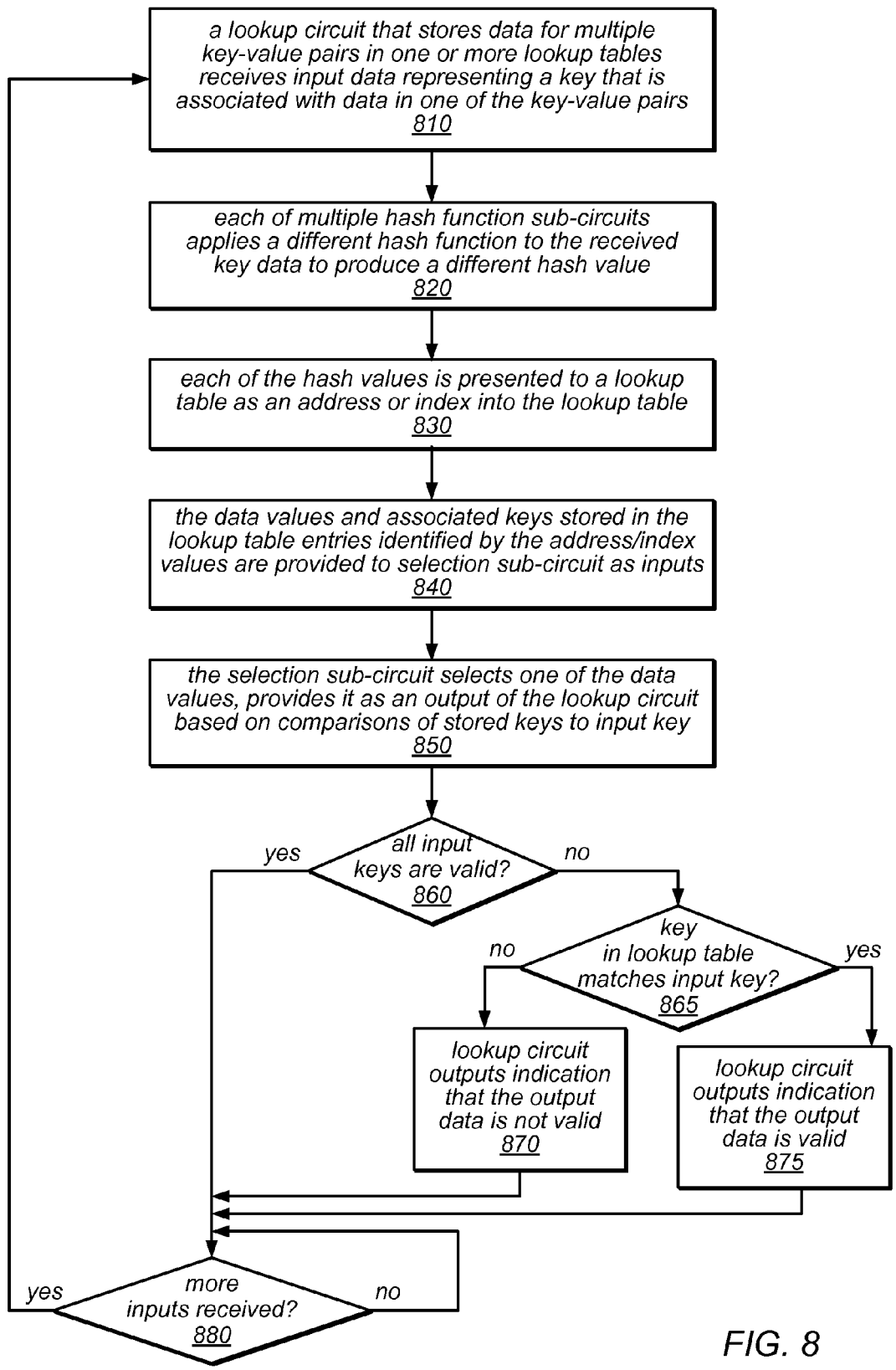
FIG. 8 is a flow diagram illustrating one embodiment of a method for selecting and/or validating a data value in a lookup table that is associated with a given key.

One embodiment of a method for selecting and/or validating a data value in a lookup table that is associated with a given key (if any such data value is stored in the lookup circuit) is illustrated by the flow diagram in FIG. 8. As illustrated in this example, the method may include a lookup circuit that stores data for multiple key-value pairs in one or more lookup tables receiving input data representing a key that is associated with data in one of the key-value pairs (as in 810). In response to receiving the input key data, the method may include each of multiple hash function sub-circuits applying a different hash function to the received key data to produce a respective hash value, as in 820. For example, each of the multiple hash function sub-circuits may produce a different hash value, in some embodiments. As illustrated in FIG. 8, the method may include each of the hash values being presented to a lookup table as an address or index into the lookup table (as in 830). For example, as described herein, data corresponding to a collection of valid key-value pairs may be stored in various entries of a single lookup table implemented in a dual-ported memory, or may be stored in entries of multiple lookup tables implemented in respective single-ported memories (e.g., a separate lookup table for each hash function).

As illustrated in this example, the method may include the data values and associated keys stored in the lookup table entries identified by the address/index values being provided to a selection sub-circuit as inputs (as in 840), and the selection sub-circuit selecting one of the data values (based, for example, on one or more comparisons between key information stored in the lookup circuit and the input key) and providing the selected data value as an output of the lookup circuit (as in 850). Note that this method of selection may eliminate some data values that are associated with non-matching keys, but may not guarantee that the selected data value is associated with a matching key. In other words, in some embodiments, many different keys may be stored in the lookup table (e.g., they may be stored in lookup table entries along with their associated data values, or elsewhere) and the key for the selected data value may be compared to the input key. If the keys match, the output data value may be considered valid (and a validity signal output may be true, indicating that the data value is indeed associated with the input key). However, if the keys do not match, the input key may not have been a valid key (meaning that it cannot be successfully evaluated because no key-value pair corresponding to the input key exists in the lookup circuit. In this case, the validity signal output may be false, indicating that the data value is not associated with the input key).

As illustrated in FIG. 8, if it is known that all possible keys that could be input to the lookup circuit are valid (i.e., that only keys for which a corresponding data value is known to be stored in the lookup circuit will be input to the lookup circuit), there may be no need to validate the selected data value or the input key. For example, in some embodiments, the lookup circuit may be employed in a system or application in which only valid keys can be presented to the lookup circuit, in which case the lookup circuit may not include (or may not utilize) a validation sub-circuit. This is illustrated in FIG. 8 by the path from the negative exit of 860 to 880. However, if it is not known whether all possible keys that could be input to the lookup circuit are valid (or that a corresponding data value is stored in the lookup circuit for all possible input key values), the method may include determining (e.g., using a validation sub-circuit or combinatorial logic) whether the key stored in the lookup table in association with the selected data value matches the input key (as in 865). If the key stored in the lookup table in association with the selected data value matches the input key (shown as the positive exit from 865), the method may include the lookup circuit outputting an indication that the output data is valid (as in 875). However, if the key stored in the lookup table in association with the selected data value does not match the input key (shown as the negative exit from 865), the method may include the lookup circuit outputting an indication that the output data is not valid (as in 870). As described herein, this may indicate that the input key was not valid and/or that no key-value pair for that input key is stored in the lookup circuit.

As illustrated in this example, until and unless additional inputs are received, there may be nothing for the lookup circuit to evaluate. This is illustrated in FIG. 8 by the feedback from the negative exit of 880 back to the input of 880. However, when and if any additional inputs are received, the method may include repeating the operations illustrated as 810-875 for any additional inputs. This is illustrated in FIG. 8 by the feedback from the positive exit of 880 to 810.

Figure 9:
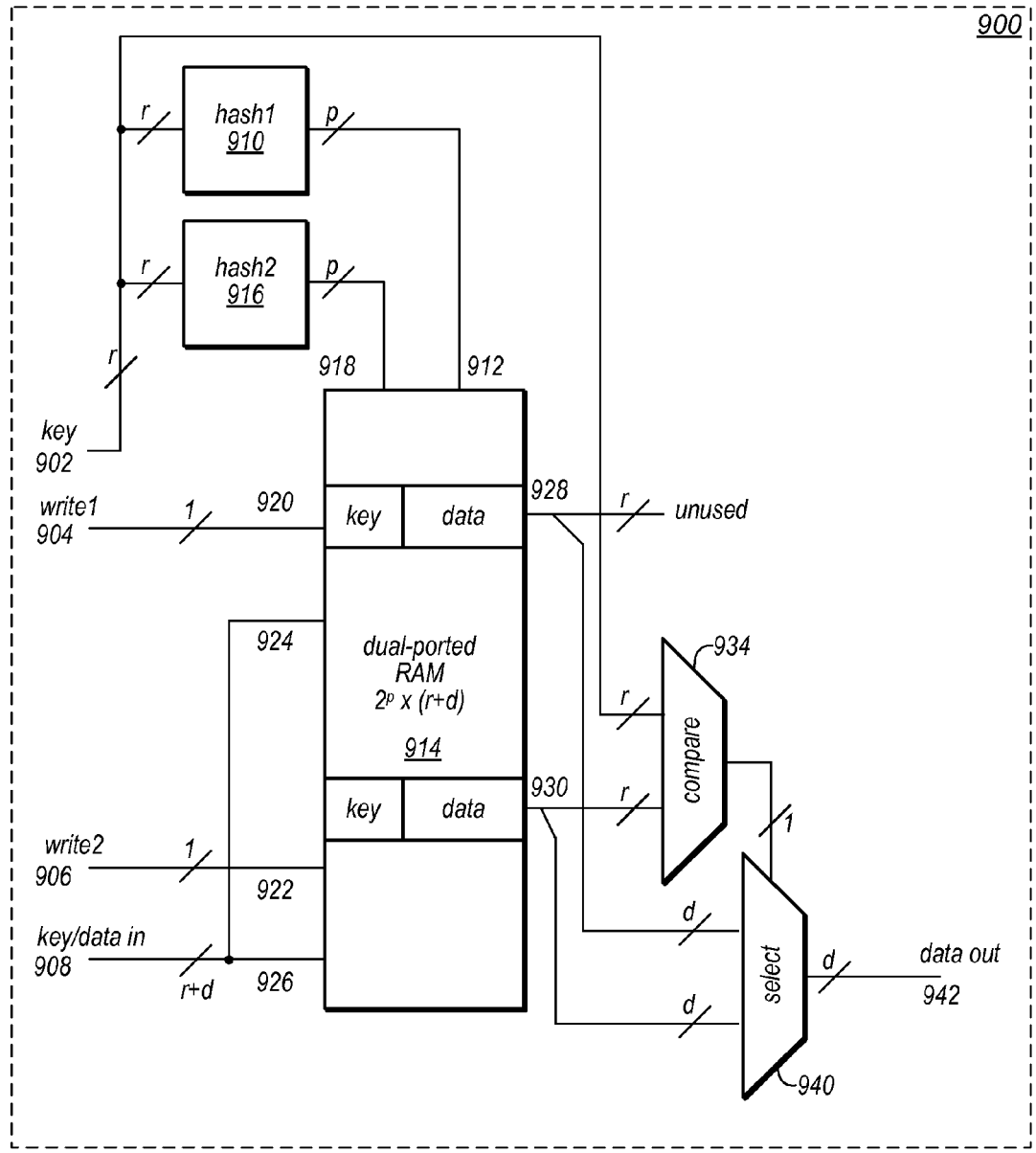
FIG. 9 is a block diagram illustrating a lookup circuit that accepts inputs and produces outputs in the same manner as the abstract lookup circuit illustrated in FIG. 4B, according to one embodiment.

In some embodiments, the lookup circuits described herein may not include a validation signal output. For example, in an application in which it is known that the lookup circuit will always be presented with a valid key input (e.g., one that is known to have associated data in a valid key-value pair and for which it is known that there will be a corresponding entry for the key-value pair in the lookup circuit), it may not be necessary for the lookup circuit to provide a validation signal output. FIG. 9 is block diagram illustrating one such lookup circuit that is configured to accept inputs and to produce outputs in the same manner as the abstract circuit 422 shown in FIG. 4B, according to one embodiment. In many respects, the lookup circuit 900 is similar to the lookup circuit 600 illustrated in FIG. 6. However, lookup circuit 900 differs from lookup circuit 600 in that the comparator 632 and the OR gate 636 of lookup circuit 600 are omitted in lookup circuit 900, and the leftmost r bits of the read-data output port 928 (which correspond to the leftmost r bits of first read-data output port 628 in lookup circuit 600 and which represent the key of a key-value pair) are unused and not connected to any other circuit element in lookup circuit 900.

In this example, lookup circuit 900 includes a first hash function sub-circuit 910 that is configured to accept the key 902 and to produce a p-bit output that is connected to a first address input 912 of a dual-ported RAM 914. The lookup circuit 900 also includes a second hash function sub-circuit 916 that is configured to accept the key 902 and to produce a p-bit output that is connected to a second address input 918 of the dual-ported RAM 914. In this example, the first address input 912 of the dual-ported RAM 914 and the second address input 918 are at least p bits wide. In some embodiments, the first hash function sub-circuit 910 and/or the second hash function sub-circuit 916 may be implemented as p copies of the circuit shown in FIG. 3, using bit matrices A1 and A2, respectively, and a bit vectors y1 and y2, respectively, where A2 may be the same as A1 or may be different from A1, and y2 may be the same as y1 or may be different from y1.

In this example, lookup circuit 900 contains other circuit elements (e.g., write-data input ports 924 and 926, read-data output ports 928 and 930, comparator 934, and selector 940) that may correspond in their behavior, connections, and purpose to similarly numbered circuit elements of the lookup circuit 600 (e.g., write-data input ports 624 and 626, read-data output ports 628 and 630, comparator 634, selector 640). Similarly, lookup circuit 900 includes inputs and outputs (e.g., write inputs 920 and 922, key/data input 908, and data output 942) that may correspond in their behavior, connections and purpose to similarly number inputs and outputs of lookup circuit 600 (e.g., write inputs 620 and 622, key/data input 608, and data output 642). In this example, the operation and behavior of the lookup circuit 900 may be substantially similar to the behavior of the lookup circuit 600 in its ability to insert and delete key-value pairs and to query the lookup table for a key-value pair matching a given key, but the lookup circuit 900 does not produce a validity signal that corresponds to the validity signal 638 in lookup circuit 600. As illustrated in this example, a lookup circuit that does not provide such a validity signal output (such as the lookup circuit 900) may require less hardware for its implementation than the lookup circuit 600 (e.g., it may require at least one fewer comparator and one fewer OR gate).

Figure 10:
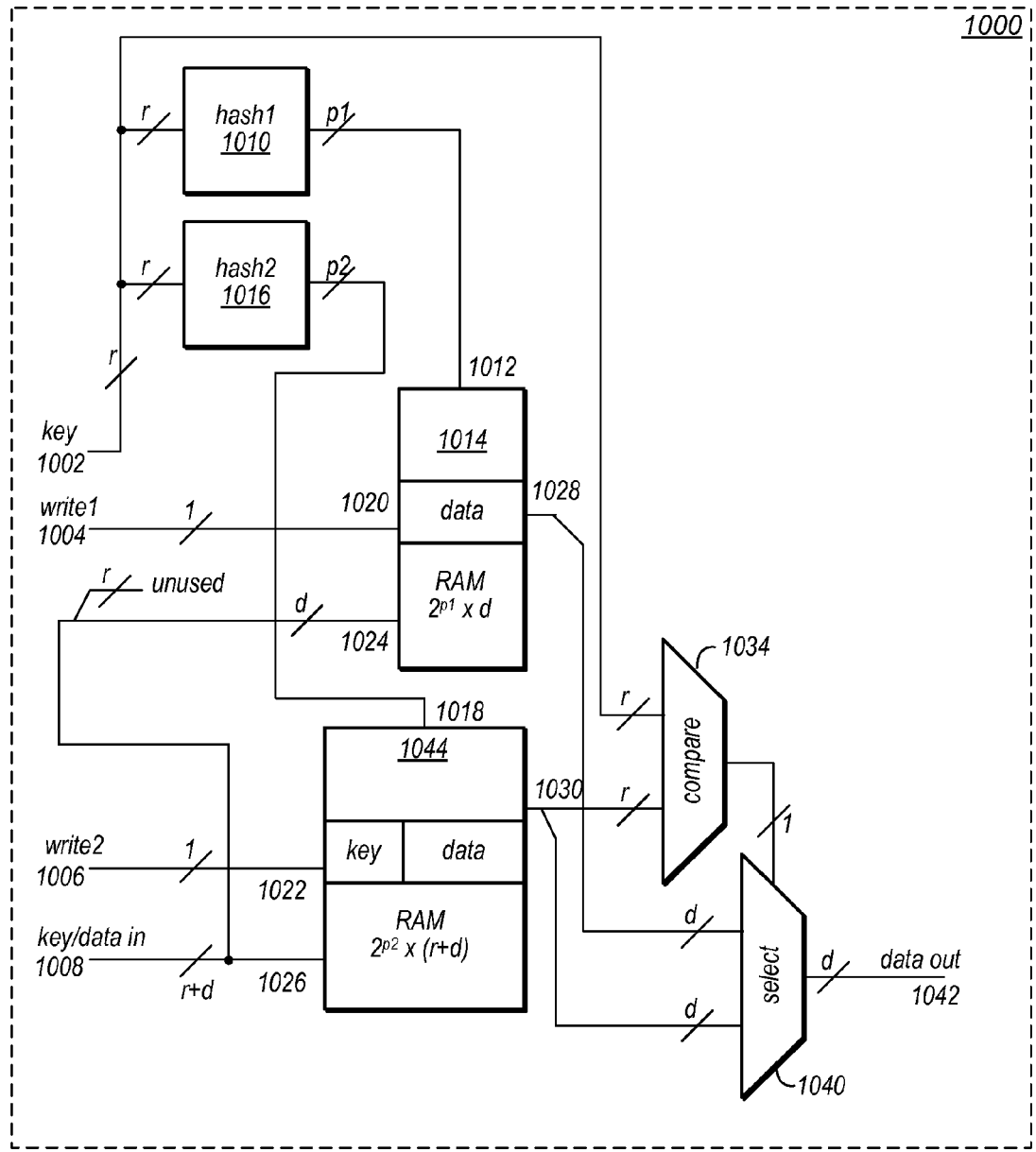
FIG. 10 is a block diagram illustrating a lookup circuit that accepts inputs and produces outputs in the same manner as the abstract lookup circuit illustrated in FIG. 4A, according to another embodiment.

In some embodiments in which the lookup circuit includes two single-ported RAMs and does not provide a validation signal output, it may not be necessary for both of the single-ported RAMs to be wide enough to store the keys along with their corresponding data values. FIG. 10 is a block diagram illustrating one such lookup circuit that is configured to accept inputs and to produce outputs in the same manner as the abstract circuit 422 shown in FIG. 4A, according to one embodiment. In many respects, the lookup circuit 1000 is similar to the lookup circuit 700 illustrated in FIG. 7. However, in this example, the keys are stored in only one of the two single-ported RAMs, rather than in both of the single-ported RAMs. In this example, because it is known that only valid keys will be presented to the lookup circuit, if an input key does not match a key obtained from the one of the single-ported RAMs that stores the keys, then the data value output from the other one of the single-ported RAMs must be the correct one (i.e., it must be the data value associated with the input key). In such embodiments, the lookup circuit may not need to perform an additional key comparison operation for the other one of the single-ported RAMs.

More specifically, in the example illustrated in FIG. 10, lookup circuit 1000 differs from lookup circuit 700 in that the comparator 732 and the OR gate 736 of lookup circuit 700 are omitted, and the first single-ported RAM 714 of lookup circuit 700 has been replaced in lookup circuit 1000 with a first single-ported RAM 1014 that does not store the key values of the key-value pairs for which it supports lookups. In other words, in this example, the keys are stored in single-ported RAM 1044 (which may be similar to single-ported RAM 744 in FIG. 7), but not in single-ported RAM 1014 (which differs from single-ported RAM 714 in FIG. 7 in at least the ways described herein). In this example, the first single-ported RAM 1014 may be configured to contain at least $2^{p1}$ words of memory, where each word holds at least d bits (representing a d-bit data value of a key-value pair), and the second single-ported RAM 1044 may be configured to contain at least $2^{p2}$ words of memory, where each word holds at least r+d bits (representing both an r-bit key and a d-bit data value for a key-value pair). In some embodiments of the lookup circuit 1000, p1 may be equal to p2, while in embodiments, p1 may not be equal to p2. As illustrated in this example, lookup circuit 1000 differs from lookup circuit 700 in that comparator 732 and the OR gate 736 of lookup circuit 700 are omitted in lookup circuit 1000. In addition, in this example, only d bits (which correspond to the rightmost d bits of first read-data output port 728 in lookup circuit 700 and which represent the data value portion of a key-value pair) are presented at first read-data output port 1028, as no key data is stored in the entries of single-ported RAM 1012.

In this example, when presented with an input key 1002, lookup circuit 1000 is configured to compute (using hash function sub-circuits 1010 and 1016) two hash values using the input key 1002. In some embodiments, the first hash function sub-circuit 1010 and/or the second hash function sub-circuit 1016 may be implemented as p1 and/or p2 copies of the circuit shown in FIG. 3, respectively, using bit matrices A1 and A2, respectively, and a bit vectors y1 and y2, respectively, where A2 may be the same as A1 or may be different from A1, and y2 may be the same as y1 or may be different from y1. In this example, the first hash function sub-circuit 1010 is configured to accept a key 1002 and to produce a p1-bit output that is connected to an address input 1012 of the first single-ported RAM 1014. Similarly, a second hash function sub-circuit 1016 is configured to accept the key 1002 and to produce a p2-bit output that is connected to an address input 1018 of the second single-ported RAM 1044. In this example, the address input 1012 of the first single-ported RAM 1014 is at least p1 bits wide, and the address input 1018 of the second single-ported RAM 714 is at least p2 bits wide.

Note that in this example, all r+d bits of key/data input information 1008 (representing a key and an associated data value) are provided to single-ported RAM 1044, but only the rightmost d bits of key/data input information 1008 (representing a data value that is associated with the input key) are provided to single-ported RAM 1014, with the other r bits (those representing the key) being unused and unconnected to any other circuit elements in lookup circuit 1000. As previously noted, because it is known that only valid keys will be presented to lookup circuit 1000 (and, thus, that a data value corresponding to every presented key will be present in a single location in lookup circuit 1000), if an input key 1002 does not match a key obtained from second single-ported RAM 1044, then the data value output from first single-ported RAM 1014 must be the correct data value (i.e., it must be the data value associated with input key 1002). In other words, the lookup circuit does not need to perform an additional key comparison operation for first single-ported RAM 1014, nor an operation to combine the results of two such key comparison operations, as was the case in lookup circuit 700.

In this example, lookup circuit 1000 contains other circuit elements (e.g., write-data input ports 1024 and 1026, read-data output ports 1028 and 1030, comparator 1034, and selector 1040), that may correspond in their behavior, connections, and purpose to similarly numbered circuit elements (e.g., write-data input ports 724 and 726, read-data output ports 728 and 730, comparator 734, and selector 740) of the lookup circuit 700. Similarly, lookup circuit 1000 includes inputs and outputs (e.g., write inputs 1020 and 1022, key/data input 1008, and data output 1042) that may correspond in their behavior, connections and purpose to similarly number inputs and outputs of lookup circuit 700 (e.g., write inputs 720 and 722, key/data input 708, and data output 742). In this example, the operation and behavior of the lookup circuit 1000 may be substantially similar to the behavior of the lookup circuit 700 in its ability to insert and delete key-value pairs and to query the lookup table for a key-value pair matching a given key, but the lookup circuit 1000 does not produce a validity signal output that corresponds to the validity signal 738 of lookup circuit 700. As illustrated in this example, a lookup circuit that includes multiple single-ported RAMs, but that does not provide such a validity signal output (such as the lookup circuit 1000) may require less hardware for its implementation than the lookup circuit 700 (e.g., it may require at least one fewer comparator, one fewer OR gate, and a smaller first single-ported RAM).

In some embodiments, the lookup circuits described herein may implement more than two hash functions, but may still produce only a single set of outputs (e.g., an output data value and, in some cases, a validity signal output) based on lookup table entries accessed using the outputs of those hash functions. In some such embodiments (e.g., in embodiments in which it is known that only valid keys will be presented to the lookup circuit (and, thus, that a data value corresponding to every presented key will be present in a single location in the lookup circuit), the number of key comparisons that need to be performed in order to select the correct data value for the input key from among the multiple data values output from the memory may be one fewer than the number of hash functions. In some embodiments, the use of more than two hash functions in the lookup circuit may provide the loading process with more options (i.e., with more than two potential locations at which to store key-value pairs in applications in which multiple keys can hash to the same hash value). In such embodiments, this may in turn allow the lookup circuit to achieve an even higher density of memory usage than if the lookup circuit includes only two hash functions, with the trade-off that additional hash function hardware (e.g., an additional hash function sub-circuit) and another comparator may be required to support each additional hash function in the lookup circuit.

Figure 11:
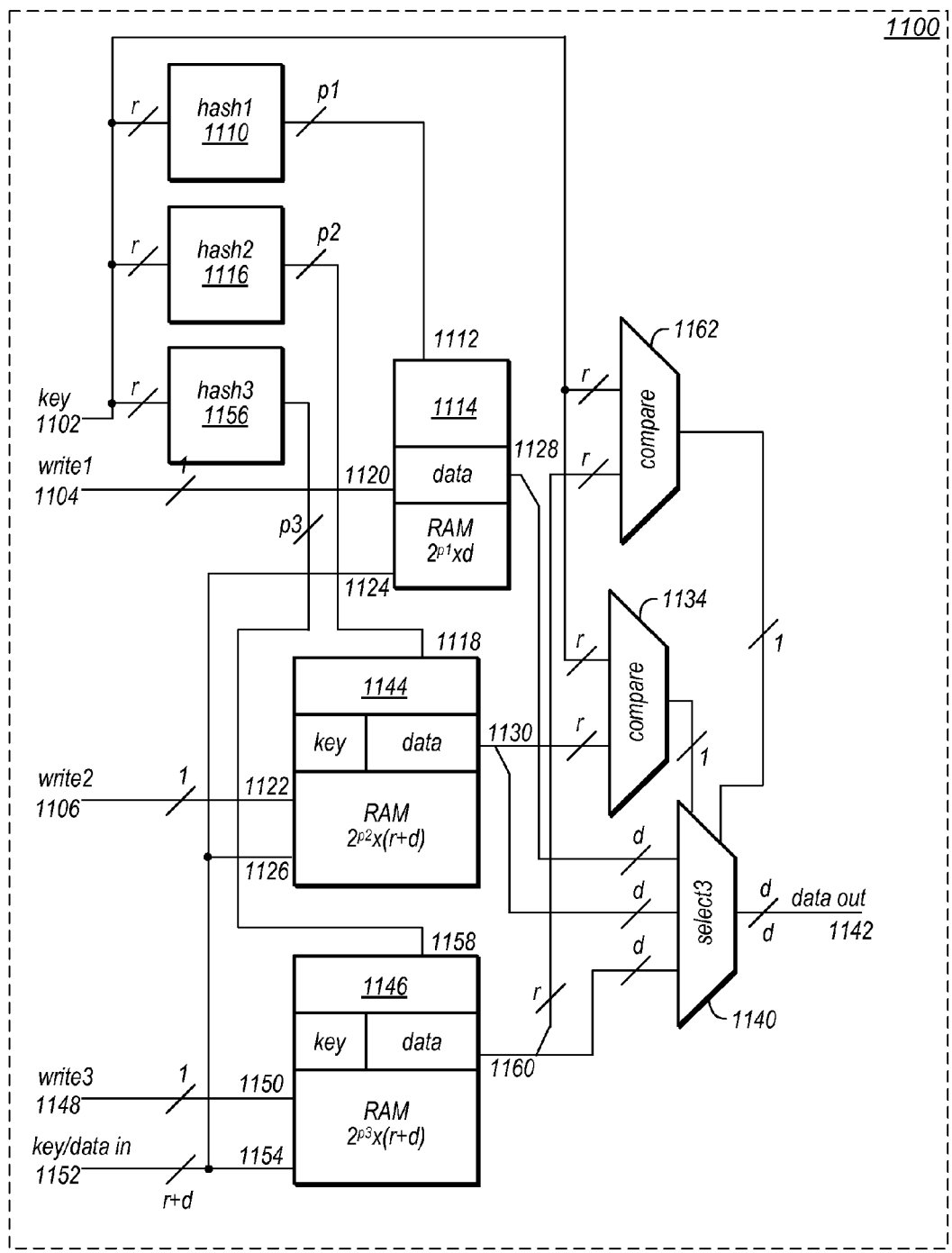
FIG. 11 is a block diagram illustrating a lookup circuit that implements three hash functions and produces output data corresponding to one of the resulting hash values, according to one embodiment.

FIG. 11 is a block diagram illustrating one such lookup circuit that is configured to accept inputs and to produce outputs in the same manner as the abstract circuit 422 shown in FIG. 4A, according to one embodiment. As illustrated in FIG. 11, the lookup circuit 1100 may be similar to the lookup circuit 1000 illustrated in FIG. 10, but it may also include a third single-ported RAM 1146. For example, lookup circuit 1100 contains circuit elements (e.g., write-data input ports 1124 and 1126), that may correspond in their behavior, connections, and purpose to similarly numbered circuit elements (e.g., write-data input ports 724 and 726) of the lookup circuit 700. In this example, the operation and behavior of the lookup circuit 1100 may be substantially similar to the behavior of the lookup circuit 700 in its ability to insert and delete key-value pairs and to query the lookup table for a key-value pair matching a given key, but the lookup circuit 1100 does not produce a validity signal output that corresponds to the validity signal 738 of lookup circuit 700. In some embodiments, a lookup circuit that includes multiple single-ported RAMs, and that does not provide such a validity signal output (such as the lookup circuit 1100) may require less hardware for its implementation than a lookup circuit that provides such a validity single output (e.g., it may require at least one fewer comparator, one fewer OR gate, and a smaller first single-ported RAM).

In this example, when presented with an input key 1102, lookup circuit 1100 is configured to compute (using hash function sub-circuits 1110, 1116, and 1156) three hash values using the input key 1102. In some embodiments, the first hash function sub-circuit 1110, the second hash function sub-circuit 1116, and/or the third hash function sub-circuit 1156 may be implemented as p1, p2, and/or p3 copies of the circuit shown in FIG. 3, respectively, using bit matrices A1, A2, and A3, respectively, and bit vectors y1, y2 and y3, respectively, where A1, A2, and A3 may be the same or may be different, and y2, y2, and y3 may be the same or may be different. In this example, the first hash function sub-circuit 1110 is configured to accept a key 1102 and to produce a p1-bit output that is connected to an address input 1112 of the first single-ported RAM 1114. Similarly, a second hash function sub-circuit 1116 is configured to accept the key 1102 and to produce a p2-bit output that is connected to an address input 1118 of the second single-ported RAM 1144. In this example, the address input 1112 of the first single-ported RAM 1114 is at least p1 bits wide, and the address input 1118 of the second single-ported RAM 1144 is at least p2 bits wide. In some embodiments of the lookup circuit 1100, p1 may be equal to p2, while in other embodiments, p1 may not be equal to p2.

In this example, the third single-ported RAM 1146 contains at least $2^{p3}$ words of memory, where each word holds at least r+d bits. In this example, the lookup circuit 1100 also includes a third write-enable input signal 1148, which is connected to a write-enable input 1150 of the third single-ported RAM 1146. The lookup circuit 1100 also includes a key/data input 1152, which is connected to a write-data input port 1124 of the first single-ported RAM 1114, a write-data input port 1122 of the second single-ported RAM 1144, and a write-data input port 1154 of the third single-ported RAM 1146. As illustrated in FIG. 11, the third hash function sub-circuit 1156 may be configured to accept the key 1102 and to produce a p3-bit output that is connected to an address input 1158 of the third single-ported RAM 1146. In this example, the address input 1158 of the single-ported RAM 1146 is at least p3 bits wide. In some embodiments of the lookup circuit 1100, p3 may be equal to p1 and/or to p2. In other embodiments, p3 may not be equal to either p1 or p2. In this example, the third single-ported RAM 1146 has a read-data output port 1160.

The lookup circuit 1100 includes a first r-bit comparator 1162 that has a first input port connected to the key input 1102 and a second input port connected to the leftmost r bits of the read-data output port 1160 of the third single-ported RAM 1146, and that is configured to produce a 1-bit signal indicating whether the two input ports have matching data. The lookup circuit 1100 also includes a second r-bit comparator 1134 that has a first input port connected to the key input 1102 and a second input port connected to the leftmost r bits of the second read-data output port 1130 of the second single-ported RAM 1144, and that is configured to produce a 1-bit signal indicating whether the two input ports have matching data.

In this example, the lookup circuit 1100 also includes a three-way selector 1140 with a first d-bit input port connected to the rightmost d bits of the read-data output port 1128 of the first single-ported RAM 1114, a second d-bit input port connected to the rightmost d bits of the read-data output port 1130 of the second single-ported RAM 1144, a third d-bit input port connected to the rightmost d bits of the read-data output port 1160 of the third single-ported RAM 1146, a first control signal connected to the output signal of the first comparator 1162, and a second control signal connected to the output signal of the second comparator 1134. In this example, the output of the three-way selector 1140 is the d-bit associated data output 1142 of the lookup circuit 1100, which may correspond to the associated data output 408 in FIG. 4A.

In this example, selector 1140, the first comparator 1162, and the second comparator 1134 are configured to deliver the rightmost d bits of the read-data output port 1160 of the third single-ported RAM 1146 to the associated data output 1142 whenever the key 1102 matches the leftmost r bits of the read-data output port 1160 of the third single-ported RAM 1146, to deliver the rightmost d bits of the read-data output port 1130 of the second single-ported RAM 1144 to the associated data output 1142 whenever the key 1102 does not match the leftmost r bits of the read-data output port 1160 of the third single-ported RAM 1146 but does match the leftmost r bits of the read-data output port 1130 of the second single-ported RAM 1144, and to deliver the rightmost d bits of the first read-data output port 1128 of the first single-ported RAM 1114 to the associated data output 1142 whenever the key 1102 does not match the leftmost r bits of the read-data output port 1160 of the third single-ported RAM 1146 and also does not match the leftmost r bits of the read-data output port 1130 of the second single-ported RAM 1144. In other words, if neither the key information output from the second single-ported RAM 1144 nor the key information output from the third single-ported RAM 1146 matches the input key 1102, the data value output from the first single-ported RAM 1114 must be the correct data value (i.e., the data value associated with the input key 1102).

In some embodiments, external circuitry, which may be under software control, may be configured to write a specific key-value pair to a memory location in the first single-ported RAM 1114 by presenting the key to key input 1102, presenting the key and value together to the key/data input 1152, and presenting a true signal to the first write-enable input 1104. In response to receiving these inputs, the lookup circuit 1100 may be configured to operate, at a clock transition or other specific time, to write the key-value pair presented to the key-data input 1152 to a memory location in the first single-ported RAM 1114 determined by the first hash function sub-circuit 1110 from the key 1102. External circuitry, which may be under software control, may be configured to write a specific key-value pair to a memory location in the second single-ported RAM 1114 by presenting the key to key input 1102, presenting the key and value together to the key/data input 1152, and presenting a true signal to the second write-enable input 1106. In response to receiving these inputs, the lookup circuit 1100 may be configured to operate, at a clock transition or other specific time, to write the key-value pair presented to the key-data input 1152 to a memory location in the first second-port RAM 1144 determined by the second hash function sub-circuit 1116 from the key 1102. External circuitry, which may be under software control, may be configured to write a specific key-value pair to a memory location in the third single-ported RAM 1146 by presenting the key to key input 1102, presenting the key and value together to the key/data input 1152, and presenting a true signal to the third write-enable input 1148. In response to these inputs, the lookup circuit 1100 may be configured to operate, at a clock transition or other specific time, to write the key-value pair presented to the key-data input 1152 to a memory location in the third single-ported RAM 1146 determined by the third hash function sub-circuit 1156 from the key 1102.

In some embodiments, the second single-ported RAM 1144 and the third single-ported RAM 1146 of the lookup circuit 1100 may be replaced by a dual-ported RAM, resulting in a lookup circuit that has three hash function sub-circuits, one single-ported RAM, one dual-ported RAM, two comparators, and one three-way selector. It will be appreciated that many other similar variations of the lookup circuits described herein are possible within the spirit and scope of the present disclosure, using multiple hash function sub-circuits and either one memory or multiple memories. It will also be appreciated that any of the RAM circuits illustrated in the drawings and/or described herein may be replaced by any other technology that supports the reading and writing of information, including but not limited to flash memory technology.

As previously noted, in some embodiments, the lookup circuits described herein may not include a validation signal output. For example, if it is known that the lookup circuit will always be presented with a valid key input and that there will be an entry for the corresponding key-value pair in a memory in the lookup circuit, the lookup circuit may not be configured provide a validation signal output. One embodiment of a method for selecting an output of a lookup circuit that does not include a validation output is illustrated by the flow diagram in FIG. 12. Note that in this example, it is assumed that the lookup circuit includes at least two hash function sub-circuits. As illustrated in this example, the method may include a lookup circuit that stores data for multiple key-value pairs in multiple lookup tables receiving input data representing a key that is associated with data in one of the key-value pairs (as in 1210). The method may also include one of multiple hash function sub-circuits applying a hash function to the received key data to produce a hash value that is usable to access a data value and an associated key in a lookup table for the hash function (as in 1215). For example, in some embodiments, each hash function sub-circuit may generate address/index values for accessing data in a respective lookup table (e.g., one that is coupled to that hash function sub-circuit or is otherwise configured to receive address/index values only from that hash function sub-circuit). In this example, if the key that is stored in the lookup table and is accessed using the hash value matches the input key (shown as the positive exit from 1220), this indicates that the accessed data is the correct data for the input key, and the method may include selecting the data value that was accessed using the hash value for output (as in 1225).

Figure 12:
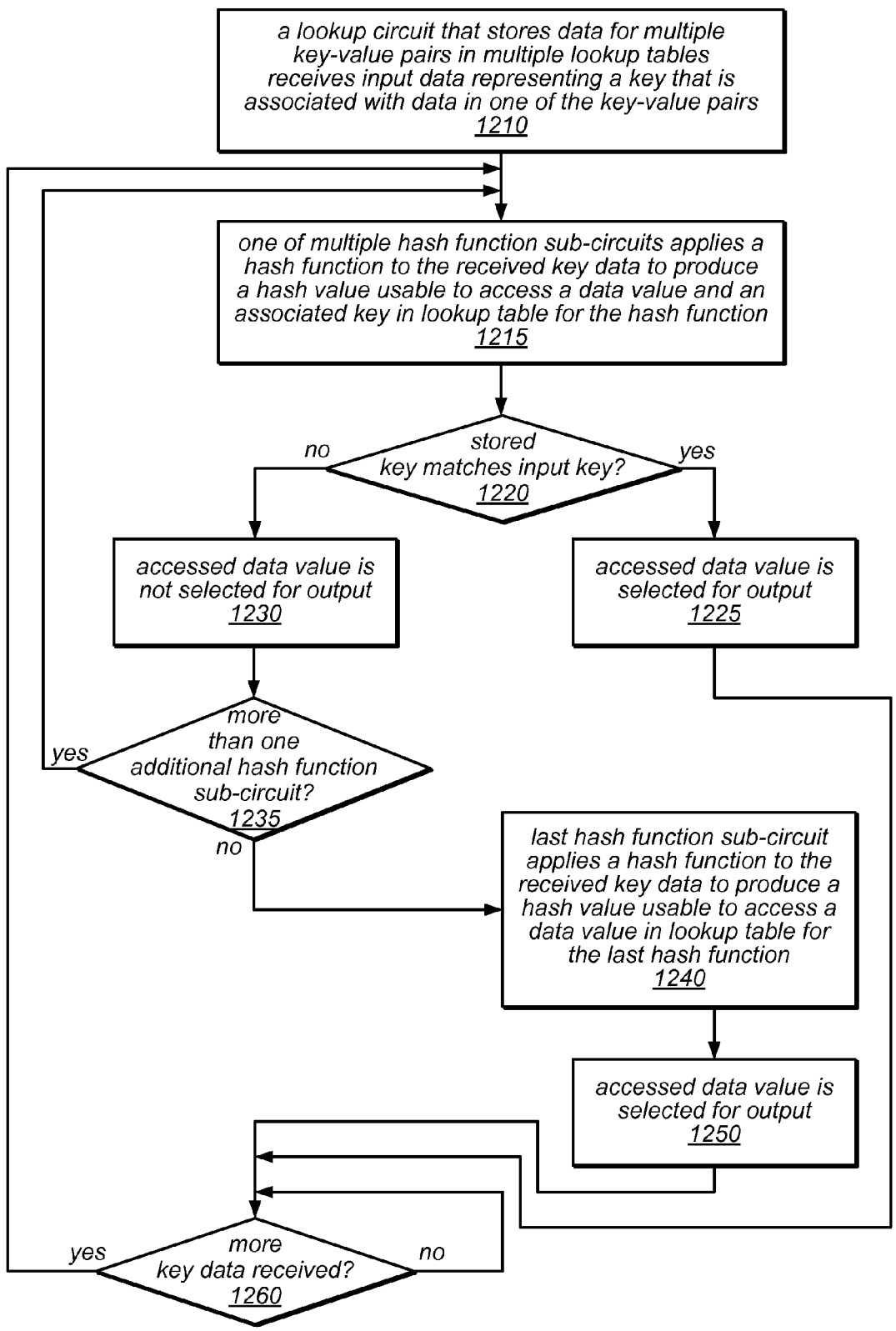
FIG. 12 is a flow diagram illustrating one embodiment of a method for selecting an output of a lookup circuit that does not include a validation output.

As illustrated in this example, in some embodiments, if the key that is stored in the lookup table and is accessed using the hash value does not match the input key (shown as the negative exit from 1220), this indicates that the accessed data value is not the data value associated with the input key, and the accessed data value will not be selected for output (as in 1230). If there is more than one additional hash function sub-circuit in the lookup circuit (shown as the positive exit from 1235), the method may include determining whether data accessed in a lookup table for another hash function sub-circuit using a hash value generated by the other hash function sub-circuit is the correct data for the input key (e.g., by determining whether the key that is stored in the lookup table the lookup table for the other hash function sub-circuit and is accessed using the hash value generated by the other hash function sub-circuit matches the input key). This is illustrated in FIG. 12 by the feedback from the positive exit of 1235 to 1215.

However, if there is only one additional hash function sub-circuit in the lookup circuit (shown as the negative exit from 1235), the method may include the last hash function sub-circuit applying a hash function to the received key data to produce a hash value that is usable to access a data value and an associated key in a lookup table for the last hash function (as in 1240), and selecting the accessed data value for output (as in 1250). In other words, once the data values accessed using hash values generated by all but the last hash function sub-circuit have been determined not to be the correct data value for the input key, the data value accessed using a hash value generated by the last hash function sub-circuit must be the correct data value for the input key. This is because, in this example, all keys are known to be valid and are known to be mapped to a single location in one of the lookup tables. In this example, there may be no need to check (or even store) keys in all of the lookup tables, which may reduce the computation time, hardware, and/or space requirements for the lookup circuit implementation.

As illustrated in this example, until and unless additional inputs are received, there may be nothing for the lookup circuit to evaluate. This is illustrated in FIG. 12 by the feedback from the negative exit of 1260 back to the input of 1260. However, when and if any additional inputs are received, the method may include repeating the operations illustrated as 1215-1250 for any additional inputs. This is illustrated in FIG. 12 by the feedback from the positive exit of 1260 to 1215. Note that in some embodiments, the generation of the hash values by multiple hash function sub-circuits may be performed in parallel (e.g., substantially concurrently), and/or the key comparison operations performed on the outputs of all but one of the corresponding lookup tables may take place in parallel (e.g., substantially concurrently). In such embodiments, the data output from the one of the lookup tables that does not store keys may be selected if no entry having a matching key is found in any of the other lookup tables.

Unlike in the FPGA-based Cuckoo Hashing technique referenced earlier, the lookup circuits described herein may in some embodiments deliver a modified version of the data values selected by the lookup operation, rather than delivering a data value obtained directly from a lookup table. For example, in some embodiments, two data values stored in a single lookup table or in separate lookup tables in the lookup circuit may be identified by respective hashes of an input key, and there may be a slight delay before the lookup circuit is able to determine which (if either) of the two data values obtained from the lookup table(s) is the correct data value for the input key (e.g., due to the comparators described herein coming before the selection sub-circuit in the lookup circuit). However, in some embodiments, combinatorial logic may be inserted before the selection sub-circuit that can be used to perform a computation on the obtained data values prior to determining which (if either) of the data values is the correct data value for the input key. In other words, in some embodiments, a combinatorial logic block of the lookup circuit may obtain "early access" to the data values obtained from the lookup table(s) (i.e., prior to determining the results of the selection process) and may be configured to apply a further computation to each of the two data values (e.g., in parallel) to produce modified versions of each of the two data values. In such embodiments, a selection sub-circuit of the lookup circuit may choose one of the modified data values resulting from the parallel computations as the output of the lookup circuit, rather than one of the two originally identified data values.

In some embodiments, the opportunity to perform a computation on the data value that is associated with the input key prior to determining the results of the selection process may improve the timing of the circuitry that receives the output of the lookup circuit (thereby reducing overall latency in the application) because at least some of the computations that would have been performed after the selection of one of the obtained data values has been moved upstream in the overall process such that it is performed prior to the selection (e.g., in parallel with or at least overlapping the operation of the comparators).

Figure 13:
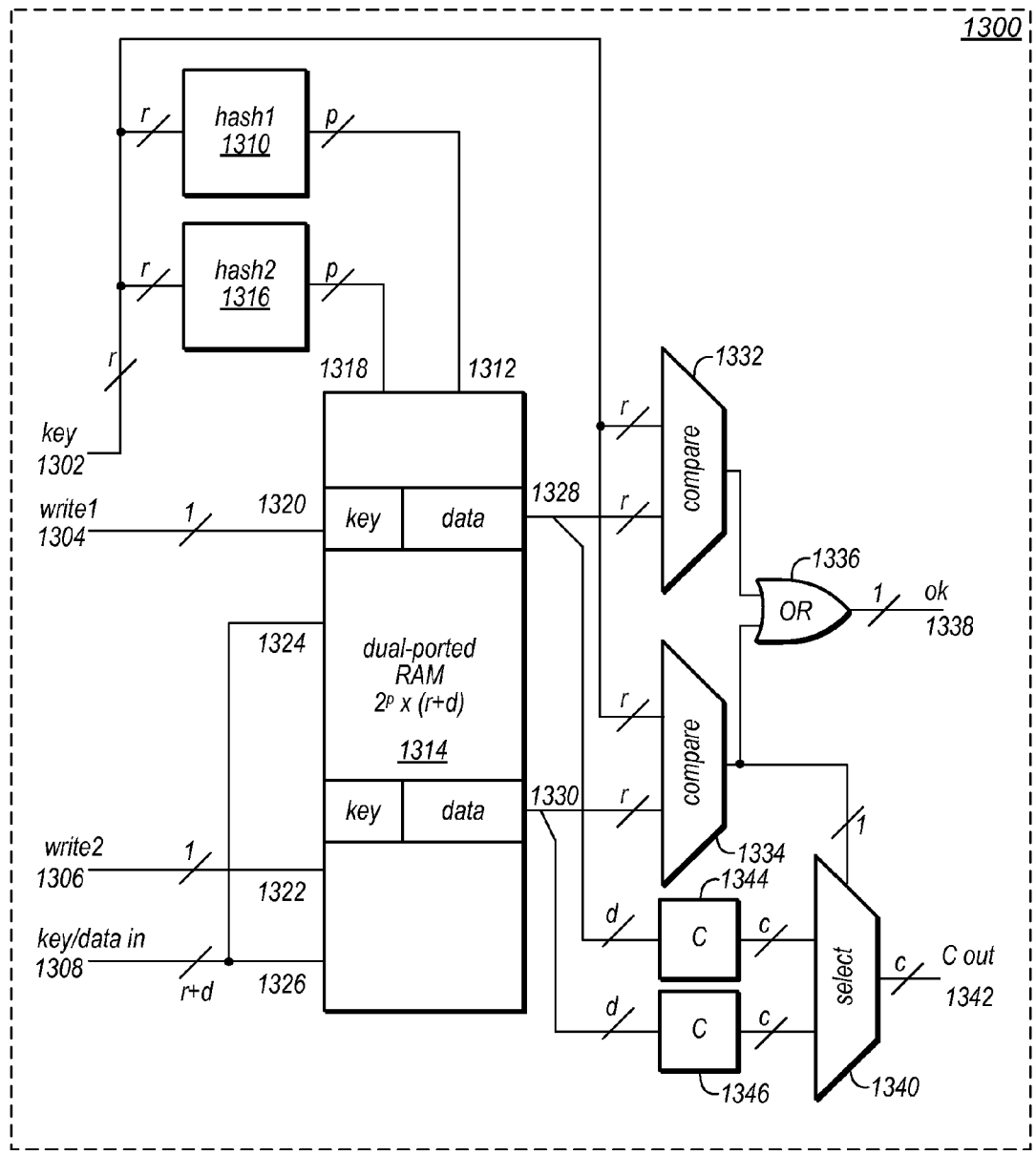
FIG. 13 is a block diagram illustrating a lookup circuit that applies a computation to the data obtained from each identified lookup table entry prior to the selection of one of them for output, according to one embodiment.

FIG. 13 is a block diagram illustrating one such lookup circuit that is configured to accept inputs and to produce outputs in the same manner as the abstract circuit 402 shown in FIG. 4A. In this example, the lookup circuit 1300 may be similar to the lookup circuit 600 illustrated in FIG. 6. For example, lookup circuit 1300 includes a first hash function sub-circuit 1310 that is configured to accept the key 1302 and to produce a p-bit output that is connected to a first address input 1312 of a dual-ported RAM 1314. The lookup circuit 1300 also includes a second hash function sub-circuit 1316 that is configured to accept the key 1302 and to produce a p-bit output that is connected to a second address input 1318 of the dual-ported RAM 1314. In this example, the first address input 1312 of the dual-ported RAM 1314 and the second address input 1318 are at least p bits wide. In some embodiments, the first hash function sub-circuit 1310 and/or the second hash function sub-circuit 1316 may be implemented asp copies of the circuit shown in FIG. 3, using bit matrices A1 and A2, respectively, and a bit vectors y1 and y2, respectively, where A2 may be the same as A1 or may be different from A1, and y2 may be the same as y1 or may be different from y1.

As illustrated in FIG. 13, however, lookup circuit 1300 includes a first computational element 1344 and a second computational element 1346 that are not present in lookup circuit 600. In addition, selector 640 of lookup circuit 600 (which has two d-bit input ports) has been replaced in lookup circuit 1300 by a selector 1340 that has two c-bit input ports. In this example, the d-bit input of the first computational element 1344 is connected to the first read-data output port 1328 of the dual-ported RAM 1314, and the c-bit output of the first computational element 1344 is connected to the first c-bit input port of the selector 1340. Similarly, the d-bit input of the second computational element 1346 is connected to the second read-data output port 1330 of the dual-ported RAM 1314, and the c-bit output of the second computational element 1346 is connected to the second c-bit input port of the selector 1340.

In some embodiments, the first computational element 1344 and the second computational element 1346 may be combinatorial circuits that perform the same computation, each accepting d bits of input and producing c bits of output representing modified versions of the data values output from the two read-data output ports of dual-ported RAM 1314. In some embodiments of the lookup circuit 1300, c is equal to d, while in other embodiments, c may not be equal to d.

In this example, lookup circuit 1300 includes other circuit elements (e.g., write-data input ports 1324 and 1326, comparators 1332 and 1334, and OR gate 1336), that may correspond in their behavior, connections, and purpose to similarly numbered circuit elements (e.g., write-data input ports 624 and 626, comparators 632 and 634, and OR gate 636) of the lookup circuit 600. Similarly, lookup circuit 1300 includes inputs and outputs (e.g., write inputs 1320 and 1322, key/data input 1308, and data output 1342) that may correspond in their behavior, connections and purpose to similarly number inputs and outputs of lookup circuit 600 (e.g., write inputs 620 and 622, key/data input 608, and data output 642). In this example, the operation and behavior of the lookup circuit 1300 may be substantially similar to the behavior of the lookup circuit 600 in its ability to insert and delete key-value pairs and to query the lookup table for a key-value pair matching a given key input 1302, and the lookup circuit 1300 produces a validity signal output 1338 that may correspond to the validity signal 638 of lookup circuit 600.

Note that in some embodiments of lookup circuit 1300, because of its inclusion of two computational elements that operate on the data values retrieved from dual-ported RAM 1314 before the selector 1340 is able to choose which to output from the lookup circuit 1300, additional computations may be overlapped in time with the key comparison operation carried out by the comparator 1334. It will also be appreciated by one of ordinary skill in the art that a similar modification may be made to any of the lookup circuits 600, 700, 900, 1000, and 1100 in order to overlap the performance of one or more computations on data values retrieved from a memory in the lookup circuit with the operation of one or more comparators or selectors in those circuits, which may reduce latency and/or otherwise improve the performance of the application in which the lookup circuit is implemented.

Figure 14:
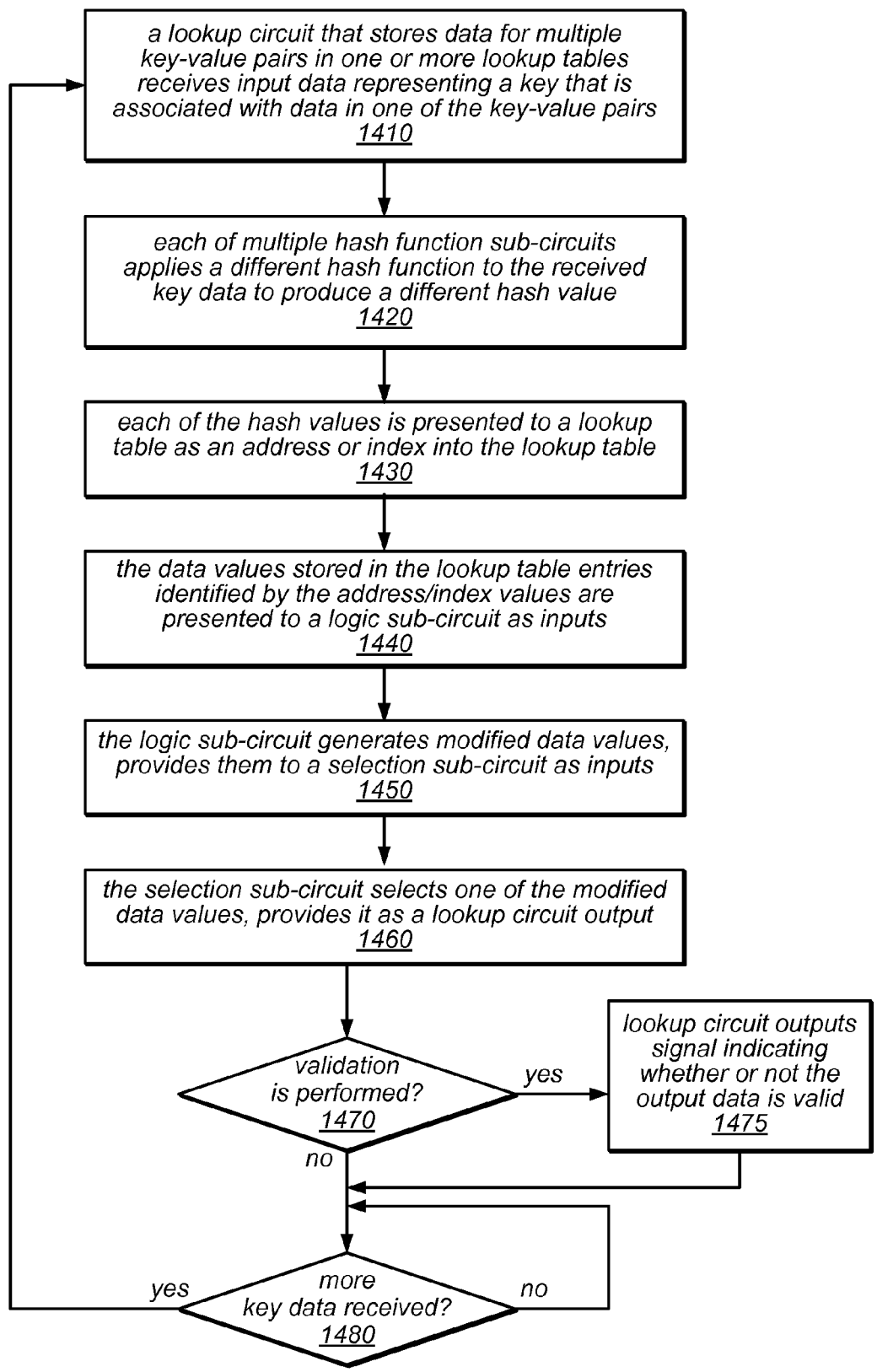
FIG. 14 is a flow diagram illustrating one embodiment of a method for evaluating a hash function and taking advantage of early access to the results.

One embodiment of a method for evaluating a hash function and taking advantage of early access to the results (including modifying the results prior to their selection) is illustrated by the flow diagram in FIG. 14. As illustrated at 1410, in this example, the method may include a lookup circuit that stores data for multiple key-value pairs in one or more lookup tables receiving input data representing a key that is associated with data in one of the key-value pairs. The method may include each of multiple hash function sub-circuits applying a different hash function to the received key data to produce a different hash value (as in 1420), after which each of the hash values is presented to a lookup table as an address or index into the lookup table (as in 1430). For example, in various embodiments, two different hash values (e.g., hash values generated by two different hash function sub-circuits from the input key value) may be presented as inputs to a single lookup table implemented in a dual-ported memory, or multiple hash values (e.g., hash values generated by multiple different hash function sub-circuits from the input key value) may be presented as inputs to respective (different) lookup tables implemented in respective single-ported memories (e.g., to a different lookup table and/or single-ported memory associated with each hash function or hash function sub-circuit).

As illustrated in this example, the method may include the data values stored in the lookup table entries identified by the address/index values being presented to a logic sub-circuit as inputs (as in 1440). It may also include the logic sub-circuit generating modified data values and providing them to a selection sub-circuit as inputs (as in 1450). As illustrated at 1460, the method may include the selection sub-circuit selecting one of the modified data values and providing it as a lookup circuit output. If the lookup circuit is configured to perform validation (whether as part of its standard operation or specifically for this key or collection of key-value pairs), the method may include the lookup circuit outputting a signal indicating whether or not the output data is valid. This is illustrated in FIG. 14 by the path from the positive exit of 1470 to 1475. If the lookup circuit is not configured to perform validation (in general, or for this specific key or collection of key-value pairs), the operation illustrated at 1475 may be skipped. This is illustrated in FIG. 14 as the path from the negative exit of 1470 to 1480. For example, if it is known that the lookup circuit will always be presented with a valid key input and that there will be an entry for the corresponding key-value pair in a memory in the lookup circuit, the lookup circuit may not be configured provide a validation signal output.

As illustrated in this example, until and unless additional key data inputs are received, there may be nothing for the lookup circuit to evaluate. This is illustrated in FIG. 14 by the feedback from the negative exit of 1480 back to the input of 1480. However, when and if any additional key data inputs are received, the method may include repeating the operations illustrated as 1410-1475 for any additional inputs. This is illustrated in FIG. 14 by the feedback from the positive exit of 1480 to 1410.

Note that in some embodiments of the lookup circuits described herein, the write-enable signals and key-data/in signals may be omitted. In such embodiments, some other means may be used to specify (and/or load) the contents of the memories in the lookup circuits or to specify the contents of a memory in another technology that supports the reading and writing of information (including, but not limited to, flash memory technology). In other embodiments, the RAM circuits illustrated in the figures and described herein may be replaced with some form of read-only memory technology and the write-enable signals and key-data/in signals of these lookup circuits may be omitted.

In some embodiments, one or more of the hash function sub-circuits illustrated in the figures and described herein may perform a multiplication by a sparse bit matrix (e.g., a bit matrix in which each row has at most six 1-bits). In other embodiments, one or more of the hash function sub-circuits may perform a multiplication by a bit matrix for which at least one row (or, alternatively, all rows) include at least twice as many 0-bits as 1-bits. In still other embodiments, one or more of the hash function sub-circuits may perform a multiplication by a bit matrix for which at least one row (or, alternatively, all rows) include at least twice as many 1-bits as 0-bits.

It will be appreciated by one of ordinary skill in the art that the specific choice to store an r-bit key and d bits of associated data into a memory word by storing the key into the leftmost r bits and the associated data into the rightmost d bits is only one illustrative choice among many, that other ways of storing or encoding an r-bit key and d bits of associated data into a memory word holding at least r+d bits are possible, and that these and other such design variations fall within the spirit and scope of this disclosure. For example, in one embodiment, data representing the key may be stored in the rightmost r bits of a memory word and the associated data may be stored in the leftmost d bits of the memory word. In another example, the bits representing the key and the bits representing the associated data may be interleaved within a memory word, in some embodiments. Similar remarks apply to the storing of both data and index information within a single memory word.

While the lookup circuits 600, 700, 900, 1000, and 1300 described herein illustrate a query process that performs computation and memory accesses in combinatorial logic, it will be appreciated by one of ordinary skill in the art that in other embodiments, the computation and memory accesses may be performed sequentially and may be divided into multiple pipeline stages, while still falling within the spirit and scope of the present disclosure. Note also that in various embodiments of the lookup circuits 600, 700, 900, 1000, and 1300, the hash function sub-circuits included in those lookup circuits may be implemented in FPGAs or using any other suitable implementations of the hash function circuitry described herein. In general, any or all of the hash functions described herein may be defined through memory content, may be implemented in fixed combinatorial logic (e.g., gates), may be implemented in programmable combinatorial logic, or may be implemented using any combination of these and other technologies suitable for implementing the functionality of a hash function sub-circuit. In some design environments (e.g., those that utilize FPGAs), high-density SRAMs may be readily available for use in implementing the techniques described herein, while the construction of CAMs could be costly in terms of resources.

In general, the lookup circuits described herein may be configured to generate an index into a lookup table (e.g., a lookup table that stores data for a collection of valid key-value pairs) from an input key value k to obtain a data value that is associated with the input key. In one example, the set of valid keys for a lookup table includes five key values. More specifically:

k∈{"apple", "blue", "cat", "motor", "Bob"}

In this example, in response to receiving an input key, two or more hash functions are applied to the input key value k (e.g., by two hash function sub-circuits) to obtain respective addresses/indexes into a lookup table. In some embodiments of the lookup circuits described herein, for the purpose of computing hash values, the keys may be represented as bit vectors using a character encoding scheme, e.g., the American Standard Code for Information Interchange (ASCII). For example, using ASCII encoding, the key "cat" may be represented as a bit vector 0110_0011_0110_0001_0111_0100. The two addresses/indexes may be used to obtain data values from the lookup table, one of which may be selected as an output of the lookup circuit. For example, if one of the obtained data values is a data value that is associated with the input key value k, that data value may be provided as an output of the lookup circuit.

Table 1 below illustrates an example mapping between various key values (in this case, the set of valid keys described above), and the two hash values generated for each of those keys. In this example, for the key value "apple", a first hash value of 7 is generated by a first hash function sub-circuit and a second hash value of 8 is generated by a second hash function sub-circuit. Similarly, the first and second hash values for valid key "blue" include 1 and 2, the first and second hash values for valid key "cat" include 2 and 7, the first and second hash values for valid key "motor" include 3 and 4, and the first and second hash values for valid key "Bob" include 9 and 5.

TABLE 1

| key value | hash value1 | hash value2 |
|---|---|---|
| apple | 7 | 8 |
| blue | 1 | 2 |
| cat | 2 | 7 |
| motor | 3 | 4 |
| Bob | 9 | 5 |

Table 2 below illustrates a mapping between various key-value pairs (including key-value pairs for the set of valid keys described) that are stored in a dual-ported memory and the index values usable to access those key-value pairs, according to one embodiment.

TABLE 2

| index value | stored key-value pair (k, d) |
|---|---|
| 0 | Fj80, 434 |
| 1 | blue, g89s |
| 2 | cat, 8055 |
| 3 | motor, 28666 |
| 4 | 55 mkh, 35djf |
| 5 | 7g2j, 76904 |
| 6 | F4ht9, 9477 |

TABLE 2-continued

| index value | stored key-value pair (k, d) |
| --- | --- |
| 7 | apple, 5639 |
| 8 | J8b97, 482068 |
| 9 | Bob, 26780 |

In this example, when presented with the key value "apple", the two hash function sub-circuits of the lookup circuit may be configured to generate hash values of 7 and 8, respectively, each of which identifies a location in a lookup table in the dual-ported memory that stores a key-value pair. As illustrated in Table 2, the key value pair stored in the location accessed using a hash value of 8 as an index contains data representing a key-value pair "J8b97, 482068". Since the portion of the data representing the key portion of this entry does not match the input key "apple", the value in the data portion of this lookup table entry is not the correct data value for this input key. In fact, the value in the portion of this lookup table entry representing a key does not match any of the valid keys, which may indicate that the lookup table entry contains random information. However, the key value pair stored in the location accessed using a hash value of 7 as an index contains data representing a key-value pair "apple, 5639". Since the portion of the data representing the key matches the input key "apple", the value in the data portion of this lookup table entry (i.e., 5639) is the correct data value for this input key and may be provided as an output of the lookup circuit.

In another example, when presented with the key value "cat", the two hash function sub-circuits of the lookup circuit may be configured to generate hash values of 2 and 7, respectively. As illustrated in Table 2 and noted above, the key value pair stored in the location accessed using a hash value of 7 as an index contains data representing a key-value pair "apple, 5639". Since the portion of the data representing the key does not match the input key "cat", but instead matches another valid input key "apple", the value in the data portion of this lookup table entry is not the correct data value for this input key. However, the key value pair stored in the location accessed using a hash value of 2 as an index contains data representing a key-value pair "cat, 8055". Since the portion of the data representing the key matches the input key "cat", the value in the data portion of this lookup table entry (i.e., 8055) is the correct data value for this input key and may be provided as an output of the lookup circuit.

Figure 15:
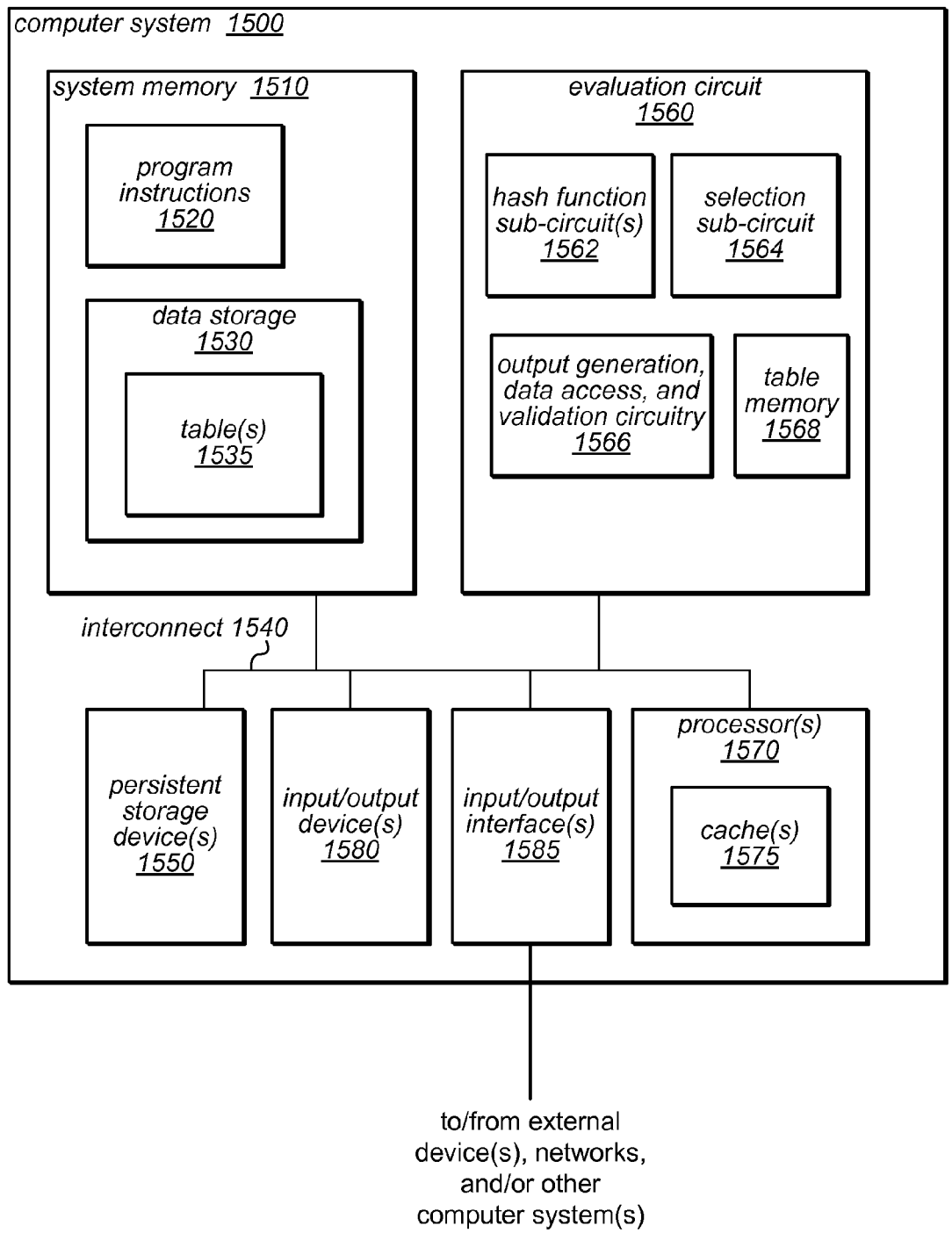
FIG. 15 is a block diagram illustrating one embodiment of a computing system that is configured to implement a hash function evaluation circuit or lookup circuit and/or to perform lookup operations using such circuits.

The techniques described herein for implementing and configuring lookup circuits (which may include generating representations of various hash functions and loading them into hash function sub-circuits), evaluating hash functions using such circuits, and/or accessing data in a lookup table using these techniques may be implemented on or by any of a variety of computing systems, in different embodiments. For example, the hash function evaluation circuits described herein may be implemented in various circuit-level network processing devices including network interface cards, network processors, smart routers/switches, etc., according to different embodiments. In different embodiments, these circuits may be implemented within a single hardware device (e.g., a single chip, card, and/or apparatus), or the functionality of these circuits may be partitioned across multiple hardware devices (e.g., multiple chips on the same card or on different cards). FIG. 15 illustrates a computer system 1500 that is configured to implement configuring lookup circuits (which may include generating representations of various hash functions and loading them into hash function sub-circuits), evaluating hash functions using such circuits, and/or accessing data in a lookup table using these techniques, according to various embodiments. The computer system 1500 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc., or in general any type of computing device.

In various embodiments, one or more of the mechanisms for implementing configuring lookup circuits (which may include generating representations of various hash functions and loading them into hash function sub-circuits), evaluating hash functions using such circuits, and/or accessing data in a lookup table using these techniques, as described herein, may be provided as a computer program product, or software, that may include a non-transitory, computer-readable storage medium having stored thereon instructions, which may be used to program a computer system 1500 (or other electronic devices) to perform a process according to various embodiments. A computer-readable storage medium may include any mechanism for storing information in a form (e.g., software, processing application) readable by a machine (e.g., a computer). The machine-readable storage medium may include, but is not limited to, magnetic storage medium (e.g., floppy diskette or hard disk); optical storage medium (e.g., CD-ROM); magneto-optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, etc.)

In various embodiments, computer system 1500 may include one or more processors 1570; each may include multiple cores, any of which may be single or multi-threaded. For example, multiple processor cores may be included in a single processor chip (e.g., a single processor 1570), and multiple processor chips may be included in computer system 1500. Each of the processors 1570 may include a cache or a hierarchy of caches 1575, in various embodiments. For example, each processor chip 1570 may include multiple L1 caches (e.g., one per processor core) and one or more other caches (which may be shared by the processor cores on a single processor). The computer system 1500 may also include one or more persistent storage devices 1550 (e.g. optical storage, magnetic storage, hard drive, tape drive, solid state memory, etc.) one or more system memories 1510 (e.g., one or more of cache, SRAM, DRAM, RDRAM, EDO RAM, DDR 10 RAM, SDRAM, Rambus RAM, EEPROM, etc.), one or more input/output interfaces 1585, and/or one or more input/output devices 1580 (e.g., keyboards, monitors, etc.). Other embodiments may include more, fewer, or different components than those illustrated in FIG. 15. For example, some embodiments may include additional components not illustrated in FIG. 15 (e.g., video cards, audio cards, additional network interfaces, peripheral devices, a network interface such as an ATM interface, a Frame Relay interface, an Ethernet interface, an Infiniband interface, etc.)

As illustrated in FIG. 15, the one or more processors 1570, the storage device(s) 1550, the input/output devices 1580, the input/output interfaces 1585, and the system memory 1510 may be coupled to the system interconnect 1540. One or more of the system memories 1510 may contain program instructions 1520. Program instructions 1520 may be executable to implement one or more applications, which may include application source code and/or executable application code that is configured to generate a set of hash functions (e.g., perfect hash functions, minimal perfect hash functions or other types of hash functions), load various hash functions into a hash function evaluation circuit or otherwise program a hash function evaluation circuit to implement one or more hash functions, load information for key-value pairs in a lookup table, and/or initiate a table lookup operation that uses a hash function evaluation circuit to access the data associated with a presented key, as described herein. In some embodiments, program instructions 1520 may also include shared libraries, operating systems, or a compiler (e.g., one that compiles a user program written in a domain-specific programming language and/or a comma-separated values file to generate a hash function evaluation circuit configuration that implements one or more selected hash functions).

Program instructions 1520 may be encoded in platform native binary, any interpreted language such as Java™ bytecode, or in any other language such as C/C++, Java™, etc., or in any combination thereof. In various embodiments, components and/or functions implemented by program instructions 1520 (e.g., compilers, applications, operating systems, and/or shared libraries) may each be implemented in any of various programming languages or methods. For example, in one embodiment, one or more components or functions implemented by program instructions 1520 may be Java based, while in another embodiment they may be written using the C or C++ programming languages. Similarly, applications may be written using Java, C, C++, or another programming language, according to various embodiments. Moreover, in some embodiments, the different components or functions implemented by program instructions 1520 may not be implemented using the same programming language. For example, an application implemented by program instructions 1520 may be C++ based, while a compiler implemented by program instructions 1520 may be developed using C.

In various embodiments, the program instructions 1520 may include any or all of the functions, operations, or procedures, and/or other processes for implementing configuring lookup circuits (which may include generating representations of various hash functions and loading them into hash function sub-circuits), evaluating hash functions using such circuits, and/or accessing data in a lookup table using these techniques, as described herein. The system memory 1510 may further comprise data storage locations 1530 where data may be stored. For example, in some embodiments, data storage locations 1530 may store data that is associated with one or more sets of keys in lookup tables (e.g., data storage locations 1530 may include storage for one or more single-ported or dual-ported memories, each of which may store one or more lookup tables). In other embodiments, data storage locations 1530 may store data in one or more hash tables, or may store parameter values, configuration information, and/or any other data usable to implement the techniques described herein using one or more hash evaluation circuits, some of which may include values that are configurable by the programmer or by a user (e.g., data storage locations 1530 may include storage for one or more memories each of which may store one or more hash tables for various hash function sub-circuits).

As illustrated in FIG. 15, in some embodiments, computer system 1500 may include one or more hash evaluation circuits, such as evaluation circuit 1560. As illustrated in this example, each evaluation circuit 1560 may include one or more hash function sub-circuit(s) 1562, a selection sub-circuit 1564, and circuitry 1566 for performing output generation (which may include computational logic that modifies data values obtained from a lookup table before or after selection), data access, and key validation. In this example, evaluation circuit 1500 also includes table memory 1568, which may include one or more memories, each of which may store one or more hash tables and/or lookup tables, such as those described herein. In other embodiments, one or more of these hash tables may be stored in memory included within hash function sub-circuits 1562 and/or output generation, data access, and validation circuitry 1566.

In some embodiments, interconnect 1540 may be configured to couple processor(s) 1570 and/or evaluation circuit 1560 directly to a computer system network. In other embodiments, these (or other) components of computer system 1500 may be coupled to one or more external devices, network(s), and/or other computer system(s) through interconnect 1540 and input/output interface(s) 1585. For example, in some embodiments, computer system 1500 may include an interface 1585 through which network packets are received from one or more other computer systems (some of which may be similar to computer system 1500). These packets may then be routed to evaluation circuit 1560 in order to perform a table lookup operation on information (keys) contained in those packets, as described herein. In some embodiments, interconnect 1570 and input/output interface(s) 1585 may be configured to implement one or more of various interface or network standards, e.g., Peripheral Component Interconnect (PCI), Ethernet, HyperTransport (HT), Infiniband, or any variant or successor of these or other suitable input/output protocols. In other embodiments, one or more of interconnect 1570 and input/output interface(s) 1585 may be configured to implement a custom interface.

Although the embodiments above have been described in considerable detail, numerous variations and modifications will become apparent to those skilled in the art once the above disclosure is fully appreciated. For example, although many of the embodiments are described in terms of particular types of data structures (e.g., hash tables), it should be noted that the techniques and mechanisms disclosed herein for implementing configuring lookup circuits (which may include generating representations of various hash functions and loading them into hash function sub-circuits), evaluating hash functions using such circuits, and/or accessing data in a lookup table using these techniques may be applicable in other contexts and/or using structures and procedures other than those described in the examples herein. It is intended that the following claims be interpreted to embrace all such variations and modifications.

What is claimed:

1. A circuit configured to evaluate at least one hash function, comprising:
   an input configured to receive a key value;
   two or more hash function sub-circuits coupled to the input;
   a selection sub-circuit; and
   at least one memory;
   wherein each of the hash function sub-circuits is configured to:
      apply a respective hash function to the key value to produce a respective hash value; and
      provide the respective hash value to the at least one memory, wherein the respective hash value identifies a respective location in the at least one memory, and wherein at most one location in the at least one memory stores a data value that is associated with the key value;

wherein the at least one memory is configured to:
  receive the respective hash values provided by each of the hash function sub-circuits; and
  output a respective data value from each of the locations in the at least one memory identified by the received hash values; and
wherein the selection sub-circuit is configured to:
  receive the data values output from the at least one memory; and
  select one of the received data values; and
wherein the received data values that are not the selected one of the received data values are not associated with the key value.

2. The circuit of claim 1, wherein to select one of the received data values, the selection sub-circuit is configured to select the one of the received data values that is associated with the key value.

3. The circuit of claim 1,
wherein the selected one of the received data values is stored in the at least one memory in an entry of a lookup table;
wherein the lookup table further stores a key value that is associated with the selected one of the received data values;
wherein the circuit further comprises a validation sub-circuit configured to:
  compare the key value stored in the lookup table that is associated with the selected one of the received data values and the key value received by the input;
  determine whether the key value stored in the lookup table that is associated with the selected one of the received data values matches the key value received by the input; and
  output an indication of a result of the determination.

4. The circuit of claim 3, wherein to select one of the received data values, the selection sub-circuit is configured to:
  receive the indication of the result of the determination; and
  in response to the output of the validation sub-circuit indicating that the key value stored in the lookup table that is associated with the selected one of the received data values matches the key value received by the input, select the one of the received data values.

5. The circuit of claim 3, wherein in response to a determination that the key value stored in the lookup table that is associated with the selected one of the received data values does not match the key value received by the input, the validation sub-circuit is configured to output an indication that the key value received by the input is not valid or that no data value associated with the key value received by the input is stored in the lookup table.

6. The circuit of claim 1, wherein the two or more hash function sub-circuits comprises three or more hash function sub-circuits.

7. The circuit of claim 1, wherein each of the received data values is stored in the at least one memory in a respective entry of a lookup table.

8. The circuit of claim 7,
wherein the circuit comprises two hash function sub-circuits;
wherein the at least one memory comprises a dual-ported memory that stores the received data values in one or more lookup tables; and
wherein each of the two or more hash function sub-circuits is configured to provide a respective hash value to a different port of the dual-ported memory.

9. The circuit of claim 7,
wherein the at least one memory comprises two or more single-ported memories, each of which stores one of the received data values in a respective lookup table; and
wherein each of the two or more hash function sub-circuits is configured to provide a respective hash value to a different one of the two or more single-ported memories.

10. The circuit of claim 7, wherein the respective lookup table entry in which each of the received data values is stored further stores a key value that is associated with the data value.

11. The circuit of claim 1,
wherein the circuit further comprises an output of the circuit that is coupled to the selection sub-circuit; and
wherein the selection sub-circuit is further configured to provide the selected one of the received data values to the output of the circuit.

12. The circuit of claim 1,
wherein the circuit further comprises:
  an output of the circuit that is coupled to the selection sub-circuit; and
  a sub-circuit that is configured to apply one or more mathematical or logical operations to each of the data values output from the at least one memory prior to selection of the one of the received data values to produce a modified version of each of the data values output from the at least one memory; and
wherein to receive the data values output from the at least one memory, the selection sub-circuit is configured to receive the modified versions of each of the data values output from the at least one memory;
wherein to select one of the received data values, the selection sub-circuit is configured to select the modified version of one of the data values output from the at least one memory; and
wherein the selection sub-circuit is further configured to provide the modified version of the one of the data values output from the at least one memory to the output of the circuit.

13. The circuit of claim 1, wherein each of the two or more hash function sub-circuits comprises one or more of: a memory configured to apply at least a portion of a respective linear hash function to the key value, fixed combinatorial logic configured to apply at least a portion of a respective linear hash function to the key value, or programmable combinatorial logic configured to apply at least a portion of a respective linear hash function to the key value.

14. The circuit of claim 1,
wherein the key value is represented by a bit vector comprising plurality of bits; and
wherein to apply a respective hash function to the key value to produce a respective hash value, each of the two or more hash function sub-circuits is configured to multiply the bit vector by a pre-defined bit matrix.

15. A method for evaluating a hash function, comprising:
performing, by an evaluation circuit:
  receiving a given key value;
  for each of two or more hash functions:
    applying the hash function to the given key value to produce a respective hash value;
    providing the respective hash value to a lookup table, wherein the respective hash value identifies an entry in the lookup table, and wherein at most one entry in the lookup table stores a data value that is associated with the given key value; and
    accessing a data value in the identified entry in the lookup table;

selecting one of the accessed data values, wherein accessed data values that are not selected are not associated with the given key value;

providing the selected one of the accessed data values as an output of the evaluation circuit.

16. The method of claim 15, wherein the lookup table further stores a key value that is associated with the selected one of the accessed data values;

wherein the method further comprises:

comparing the key value stored in the lookup table that is associated with the selected one of the accessed data values and the given key value;

determining whether the key value stored in the lookup table that is associated with the selected one of the accessed data values matches the given key value; and providing an output indicating a result of said determining.

17. The method of claim 15, further comprising, prior to said receiving:

for each of the two or more hash functions:

generating a representation of the hash function; and transferring the representation of the hash function to the evaluation circuit.

18. The method of claim 17, wherein said transferring comprises storing the representation of the hash function in a memory in the evaluation circuit;

wherein the method further comprises, subsequent to said accessing:

generating a representation of another hash function;

replacing the representation of one of the two or more hash functions that was previously stored in the memory with the representation of the other hash function;

receiving the given key value;

applying the other hash function to the given key value to produce another hash value; and providing the other hash value to the lookup table, wherein the other hash value identifies an entry in the lookup table; and accessing a data value in the entry in the lookup table identified by the other hash value.

19. The method of claim 15, further comprising:

prior to said receiving, storing a plurality of data values in the lookup table, wherein the plurality of data values comprises the selected one of the accessed data values;

subsequent to said accessing:

replacing at least one of the plurality of data values stored in the lookup table with a different data value, wherein the at least one of the plurality of data values comprises the data value in the lookup table that is associated with the given key value;

receiving the given key value; and accessing the different data value in the lookup table that is associated with the given key value.

20. A system, comprising:

an input configured to receive one key value at a time:

a memory comprising a lookup table, wherein the lookup table is configured to store, for each of a plurality of key values, a data value that is associated with the key value, and wherein each stored data value is associated with a single, respective one of the plurality of key values;

a hash function evaluation circuit; and two or more outputs coupled to the hash function evaluation circuit;

wherein, for each key value that is received by the input, the hash function evaluation circuit is configured to:

for each of two or more hash functions:

apply the hash function to the received key value to produce a respective hash value;

provide the respective hash value to the lookup table, wherein the respective hash value identifies an entry in the lookup table, and wherein at most one entry in the lookup table stores a data value that is associated with the received key value; and access a data value in the identified entry in the lookup table;

select one of the accessed data values;

provide the selected one of the accessed data values to one of the two or more outputs; and provide to another one of the two or more outputs a value indicating whether the selected one of the accessed data values is associated with the received key or is not associated with the received key.

* * * * *